US006950876B2

(12) United States Patent
Bright et al.

(10) Patent No.: US 6,950,876 B2
(45) Date of Patent: Sep. 27, 2005

(54) MULTIPLE-PROTOCOL HOME LOCATION REGISTER AND METHOD OF USE

(75) Inventors: Penny Lynne Bright, Naperville, IL (US); Jing Chen, Reynoldsburg, OH (US)

(73) Assignee: Lucent Technologies Inc., Murray Hill, DE (US)

( * ) Notice: Subject to any disclaimer, the term of this patent is extended or adjusted under 35 U.S.C. 154(b) by 785 days.

(21) Appl. No.: 09/812,401

(22) Filed: Mar. 19, 2001

(65) Prior Publication Data

US 2002/0169883 A1 Nov. 14, 2002

(51) Int. Cl.$^7$ .............................................. G06F 15/16
(52) U.S. Cl. ...................... 709/230; 709/220; 709/228; 709/229; 370/465; 370/467; 455/433
(58) Field of Search ................................ 709/220, 230, 709/228; 370/467, 405; 455/433

(56) References Cited

U.S. PATENT DOCUMENTS

| | | | | |
|---|---|---|---|---|
| 5,526,401 A | * | 6/1996 | Roach et al. ............ | 455/426.1 |
| 5,633,873 A | * | 5/1997 | Kay et al. ................... | 370/336 |
| 5,699,407 A | * | 12/1997 | Nguyen ...................... | 455/462 |
| 5,732,213 A | * | 3/1998 | Gessel et al. ............... | 709/224 |
| 5,845,215 A | * | 12/1998 | Henry et al. ............. | 455/426.1 |
| 5,850,445 A | * | 12/1998 | Chan et al. ................. | 380/247 |
| 5,867,788 A | * | 2/1999 | Joensuu ...................... | 455/445 |
| 5,884,157 A | | 3/1999 | Karmi | |
| 5,933,784 A | * | 8/1999 | Gallagher et al. ........ | 455/552.1 |
| 5,940,759 A | * | 8/1999 | Lopez-Torres et al. ..... | 455/433 |
| 5,963,864 A | * | 10/1999 | O'Neil et al. ............... | 455/445 |
| 6,029,067 A | * | 2/2000 | Pfundstein ............... | 455/426.1 |
| 6,035,025 A | * | 3/2000 | Hanson ................... | 379/114.2 |
| 6,148,204 A | | 11/2000 | Urs et al. | |
| 6,256,497 B1 | * | 7/2001 | Chambers ................... | 455/433 |
| 6,353,620 B1 | * | 3/2002 | Sallberg et al. ............. | 370/465 |

(Continued)

FOREIGN PATENT DOCUMENTS

| | | | | |
|---|---|---|---|---|
| WO | WO 9830050 | 7/1998 | | |
| WO | WO 00/74409 | * 7/2000 | ............ | H04Q/7/24 |
| WO | WO 0046938 | 8/2000 | | |
| WO | WO 0074409 | 12/2000 | | |
| WO | WO 0079827 | 12/2000 | | |
| WO | WO 00/79827 | * 12/2000 | ............ | H04Q/7/38 |

OTHER PUBLICATIONS

Interworking/interoperability Between DCS 1900 and IS–41 Based MAPs for 1800MHz Personal Communications Systems—Phase I, IS–129; Nortel; Jul. 1, 1996.
Network Interworking between GSM MAP and ANSI–41MAP PN–4857; vol. 0; Overview Network Reference Model; Ballot Version; Dec. 2000.
Network Interworking between GSM MAP and ANSI–41MAP PN–4857; vol. 1; Overview Network Reference Model; Ballot Version; Dec. 2000.
Network Interworking between GSM MAP and ANSI–41MAP PN–4857; vol. 2; Overview Network Reference Model; Ballot Version; Dec. 2000.

*Primary Examiner*—Zarni Maung
*Assistant Examiner*—Backhean Tiv

(57) ABSTRACT

A multiple-protocol home location register (MP HLR) comprises a processor, that generates network messages according to two or more network protocols and processes network requests and other messages to obtain information requested by two or more networks that support the two or more network protocols. One embodiment of the MP HLR (101) utilizes protocol gateways (211) that interpret network requests and generate, utilizing a common control procedures for multiple network protocols, queries to a database that provides a common source of data for supported networks. Another embodiment of an MP HLR (101) utilizes a mediation device (405) that generates and/or translates network messages according to multiple different network protocols and utilizes multiple HLRs (401, 403) or home agents, each supporting a different network protocol.

81 Claims, 14 Drawing Sheets

U.S. PATENT DOCUMENTS

| | | | | |
|---|---|---|---|---|
| 6,353,621 B1 | * | 3/2002 | Boland et al. | 370/467 |
| 6,434,134 B1 | * | 8/2002 | La Porta et al. | 370/338 |
| 6,445,920 B1 | * | 9/2002 | Pfundstein | 455/422.1 |
| 6,452,942 B1 | * | 9/2002 | Lemieux | 370/468 |
| 6,496,505 B2 | * | 12/2002 | La Porta et al. | 370/392 |
| 6,504,839 B2 | * | 1/2003 | Valentine et al. | 370/354 |
| 6,600,732 B1 | * | 7/2003 | Sevanto et al. | 370/349 |
| 6,611,533 B1 | * | 8/2003 | Liao et al. | 370/467 |
| 6,658,011 B1 | * | 12/2003 | Sevanto et al. | 370/401 |
| 6,738,803 B1 | * | 5/2004 | Dodrill et al. | 709/218 |
| 6,741,853 B1 | * | 5/2004 | Jiang et al. | 455/418 |

* cited by examiner

GSM REGISTRATION NATIVE MODE

ANSI REGISTRATION NATIVE MODE

CALL DELIVERY: GMSC = GSM, VMSC = ANSI

CALL DELIVERY: GMSC = ANSI, VMSC = GSM

MULTIPLE-PROTOCOL HOME LOCATION REGISTER AND METHOD OF USE

RELATED APPLICATIONS

This application is related to commonly assigned application Ser. No. 09/813,016 titled "Multiple-Protocol Home Location Register and Method of Use" by Thomas F. LaPorta et al., and filed on the same date as the present application.

FIELD OF THE INVENTION

This invention relates to communication systems, including but not limited to home location register operation in communication systems.

BACKGROUND OF THE INVENTION

Various types of cellular communication systems are known to provide radio telephone service to a large number of mobile subscribers using a relatively small number of frequencies. Such service is provided by dividing a service area into a number of cells and reusing the frequencies in non-adjacent cells. This cellular principle has permitted a large growth in the amount of wireless telecommunications that may be carried over the allocated radio spectrum thus providing significant expansion in the number of wireless communication subscribers. Various different cellular protocols include analog, time division multiple access (TDMA), code division multiple access (CDMA), Global System for Mobile Communications (GSM).

Similarly, various types of wireline systems and protocols provide different wireline services to a large number of users who typically utilize personal computers and other types of computing devices to access these services. Different wireline protocols and services include mobile or voice over IP (internet protocol), Authentication, Authorization, and Accounting (AAA), Session Initiation Protocol (SIP), and H.323 protocol that provides packet-based multimedia communication systems.

In many wireless communication systems, Home Location Registers (HLRs) and Visitor Location Registers (VLRs) are used to handle mobility management. HLRs and VLRs potentially may reside anywhere in the network. An HLR contains profile information for each of its mobile subscribers and the address of the current VLRs for each mobile. Each Mobile Switching Center (MSC) has a VLR that tracks mobiles currently receiving service in the serving MSC's coverage area. Whenever a mobile enters an area served by a new VLR and registers there, the latter informs the mobile's HLR of the change in the mobile's location. In addition, the VLR downloads the service profile of the roaming mobile as well as other information necessary for call termination at the mobile. During call delivery, the location and profile information in the HLR is utilized to route incoming calls to the mobile.

Mobile data communication systems utilize network servers called home agents and foreign agents to provide analogous functions to HLRs and VLRs, respectively. Wireline communication systems utilize functions such as authentication, service provisioning, user profile management, user location management, and service invocation.

As communication systems evolve and provide increased services, mobile users require more services, including roaming between and access to each different system. Issues regarding mobility management between these systems need to be resolved.

Accordingly, there is a need for a method and apparatus to provide mobility management for users between multiple systems utilizing different protocols.

SUMMARY

A multiple-protocol home location register comprises a receiver for receiving, from a requesting network of at least two networks, a network request according to one of at least two network protocols. A processor, within the home location register, is arranged and constructed to generate network messages according to the at least two network protocols and to process the network request to obtain information requested by the network request. A transmitter, operably coupled to the processor, relays the requested information to at least one of the requesting network and a destination network.

DESCRIPTION OF A PREFERRED EMBODIMENT

Figure 1:
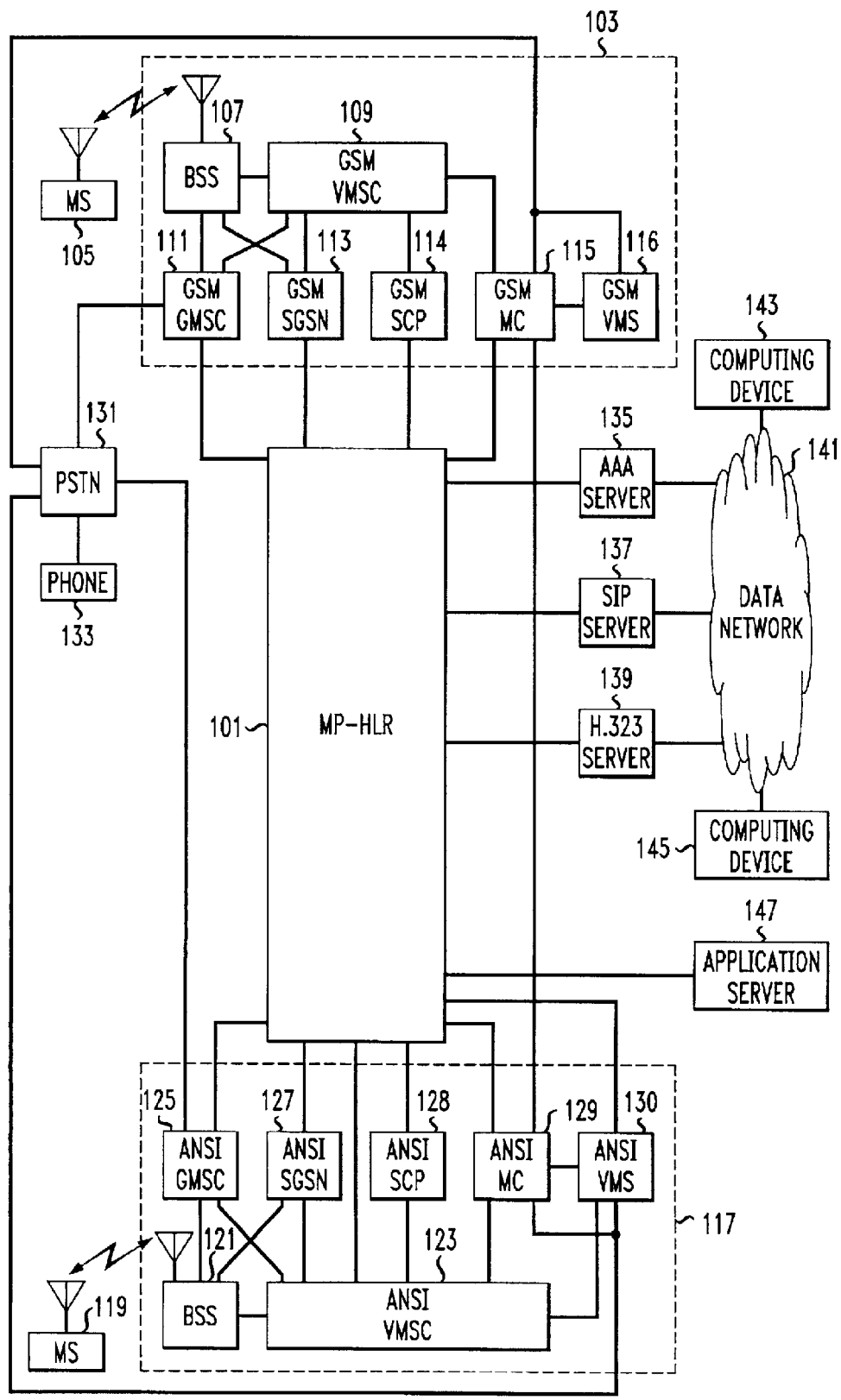
FIG. 1 is a block diagram showing multiple communication networks interfaced to a multiple-protocol HLR in accordance with the invention.

The following describes an apparatus for and method of providing mobility management for users between multiple systems utilizing different protocols through use of a multiple-protocol home location register (MP HLR). The MP HLR comprises a processor, that is preferably distributed among various elements of the MP HLR although it may be a single processor, is arranged and constructed to generate network messages according to two or more network protocols and to process network requests and other messages to obtain information requested by two or more networks that support the two or more network protocols. Two different embodiments of an MP HLR are described herein. One embodiment utilizes protocol gateways that interpret network requests and generate, utilizing a common control procedures for multiple network protocols, queries to a database that provides a common source of data for all networks. A second embodiment utilizes a mediation device that generates and/or translates network messages according to multiple different network protocols and is coupled to multiple HLRs, each supporting a different one of the multiple network protocols.

A method of the present invention comprises the steps of receiving, by a multiple-protocol home location register, a network request from a requesting network of at least two requesting networks, wherein the network request is composed according to one of at least two network protocols. The network request is processed to obtain information requested by the network request. At least one network message is generated according to at least one of the at least two network protocols and sent to at least one network supporting the at least one of the at least two network protocols. The requested information is relayed to at least one of the requesting network and a destination network.

A multiple-protocol home location register (HLR) comprises a first HLR arranged and constructed to provide a first network protocol and a second HLR arranged and constructed to provide a second network protocol. A mediation device is operably coupled to the first HLR and the second HLR and is arranged and constructed to generate network messages according to the first network protocol and the second network protocol, such that the multiple-protocol HLR provides HLR capability for a plurality of communication devices utilizing any of the first network protocol and the second network protocol.

A system utilizing a multiple-protocol home location register comprises a first infrastructure device arranged and constructed to generate at least one query according to a first network protocol and a second infrastructure device arranged and constructed to function according to a second network protocol. The multiple-protocol home location register, operably coupled to the first infrastructure device and the second infrastructure device, wherein the multiple-protocol home location register is arranged and constructed to function according to the first network protocol and the second protocol, such that a call request according to the first network protocol and related to the at least one query is completed according to the second network protocol. At least one query is generated in response to a communication device request to communicate with a serving network. A profile for the communication device is sent to the serving network and the profile is formatted according to the serving network's protocol.

A method comprises the steps of generating, by a first infrastructure device, a query according to a first network protocol and sending the first network protocol query to a multiple-protocol home location register functioning according to the first network protocol and a second network protocol. The multiple-protocol home location register processes the first network protocol query, thereby generating a second network protocol message. The second network protocol message is sent to a second infrastructure device functioning according to the second network protocol.

A block diagram of illustrating multiple communication networks interfaced to a multiple-protocol home location register (MP HLR) is shown in FIG. 1. At the center of the system is an MP HLR 101 that is capable of supporting multiple different communication protocols. These protocols may be of many varied types, including wireless and/or wireline; voice, data, and/or multimedia; and circuit and/or packet based. The MP HLR 101 performs mobility/user location management, user authentication/security control, and user profile management functions for various different network protocols. The various components of the MP HLR 101 may be geographically distributed.

One of the different types of protocols that interfaces with the MP HLR 101 is Global System for Mobile Communications (GSM), as part of a GSM system 103 shown interfaced to the MP HLR 101. A mobile subscriber unit or mobile station (MS) 105 communicates with a base station system (BSS) 107 comprised of a plurality of base stations distributed throughout a plurality of coverage areas, each serviced by one of a plurality of Visited Mobile Switching Centers (VMSCs) 109. The BSS 107 is operably coupled to the VMSCs 109, a Gateway Mobile Switching Center (GMSC) 111, and a Serving GPRS Service Node (SGSN) 113, all of which operate according to the GSM protocol. The VMSCs 109 are coupled to a GSM Service Control Point (SCP) 114, a GSM Message Center (MC) 115, also known as an Short Message Service Center (SMSC), and a GSM Voice Message System (VMS) 116. The GSM MC 115 and VMS 116 are operably coupled, and may be co-located. The VMSCs 109, GMSC 111, SGSN 113, SCP 114, and MC 115 each connect to the MP HLR 101. Similarly, networks utilizing other types of wireless protocols may also be connected to the HLR.

An ANSI communication system 117 and its interfaces to the MP HLR 101 are also shown in FIG. 1. ANSI-41 is utilized as the communication standard for infrastructure messages, and ANSI-136 is utilized as the communication standard for the air interface. An MS 119 communications with an ANSI base site system 121 comprised of a plurality of base stations distributed throughout a plurality of coverage areas, each serviced by one of a plurality of ANSI Visited Mobile Switching Centers (VMSCs) 123. The BSS 121 is operably coupled to ANSI VMSCs 123, an ANSI GMSC, which is known as an originating MSC, 125, and an ANSI SGSN 127. The ANSI VMSCs 123 are coupled to an ANSI Service Control Point (SCP) 128, an ANSI MC (message center) 129, and an ANSI VMS 130. The GMSC 125, SGSN 127, VMSCs 123, SCP 128, MC 129, and VMS 130 each connect to the MP HLR 101. The GSM MC 115 and ANSI MC 129 are operably coupled.

The PSTN (public switch telephone network) 131 provides telephone service between wireline (conventional) phones 133 and wireless devices. The GSM GMSC 111, GSM MC 115, GSM VMS 116, ANSI GMSC 123, ANSI MC 129, and ANSI VMS 130 are coupled to the PSTN 131 to enable wireline and wireless interconnections.

Wireline communication networks may also be coupled to the MP HLR 101. The MP HLR 101 provides home agent and foreign agent functionality for wireline networks. Such systems may be coupled through servers such as a AAA server 135, which provides authentication and related services utilizing the current de facto standard RADIUS, a Voice over IP (Internet Protocol) server 137 utilizing, for example, the Session Initiation Protocol (SIP) that provides an SIP registrar and proxy server, and an H.323 protocol server 139. Each of these servers 135, 137, and 139 interface to a data network 141, including wide area and/or local area networks that interconnect the computing devices 143 and 145 to the servers 135, 137, and 139. These computing devices may be personal computers (PCs), telemetry gathering devices, and wireless devices that connect to the computer, such as voice over IP or other types of devices that interconnect through wireline systems. An application server 147 is shown connected to the MP HLR 101. The application server 147 accesses user data in the MP HLR 101 for use with third party applications, such as provisioning, mobility service, and geo-location based applications.

Although examples of two wireless systems and three wireline networks are shown in FIG. 1, the present invention is applicable to other wireless and wireline systems. Other applicable systems include, for example, Code Division Multiple Access (CDMA), High Data Rate (HDR) for CDMA data, Universal Mobile Telecommunications System (UMTS), and General Packet Radio Service (GPRS). Additional coupling between devices is possible, although not shown for the sake of simplicity.

User or subscriber devices 105 or 119 may be wireline and/or wireless based, may be fixed or mobile, may be voice, data and/or multimedia, and may be packet or circuit switched, including voice over IP. Such devices include, for example, pagers, cellular phones, telephones, and personal computers, and are often known generally as mobile subscribers, mobile units, and computing devices. All such devices are referred to collectively or individually herein as communication devices.

Infrastructure devices provide switching, packet relay, internet protocol, gateway, and/or interworking functions for their associated networks for both wireless and wireline networks. Examples of infrastructure devices include packet gateways, internet protocol gateways, GGSNs (Gateway GPRS Service Nodes), and MSCs, such as gateway MSCs, originating MSCs, and terminating MSCs.

Figure 2:
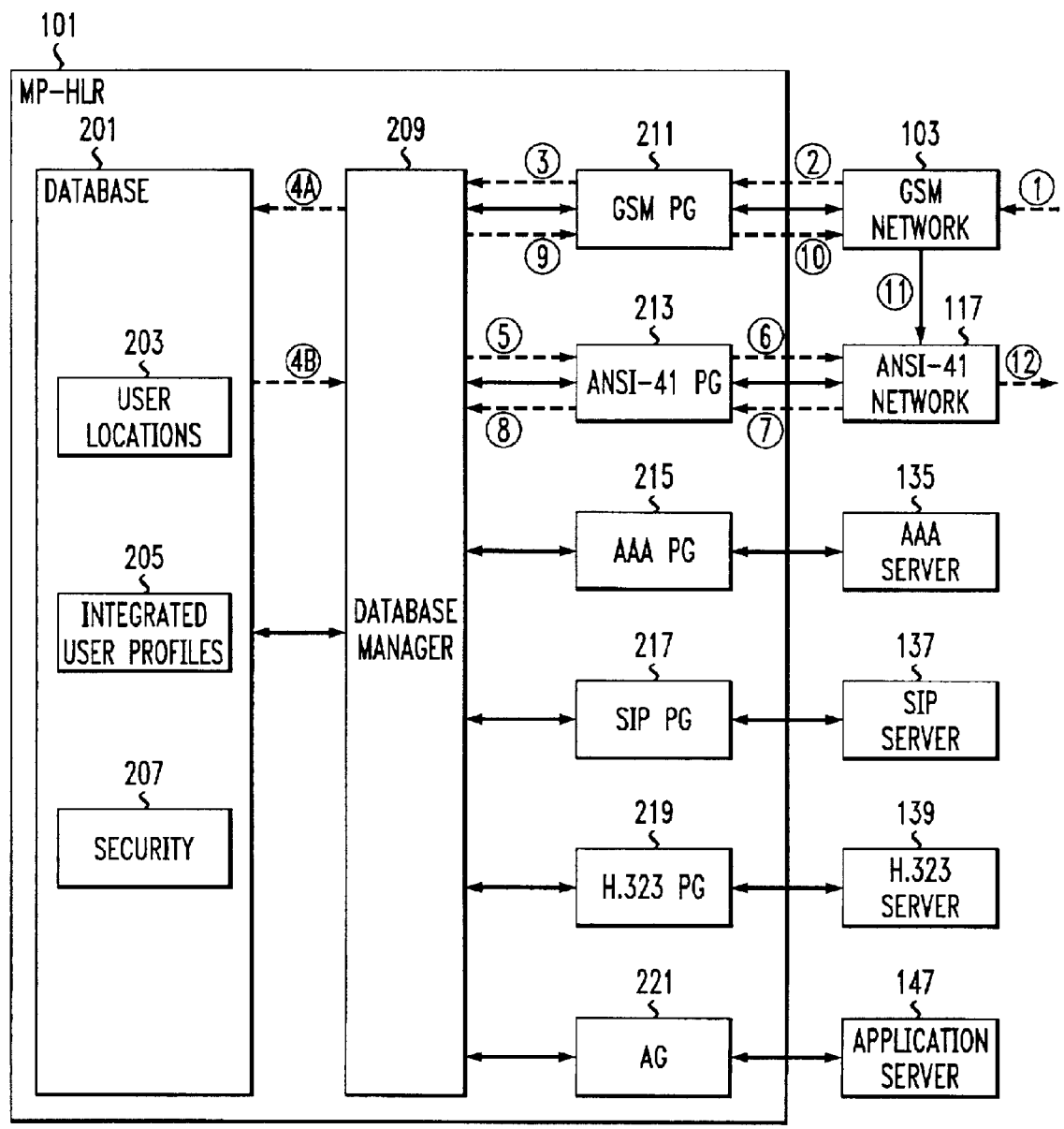
FIG. 2 is a block diagram of a first embodiment of a multiple-protocol HLR in accordance with the invention.

A block diagram of a first embodiment of a multiple-protocol HLR is shown in FIG. 2. The MP HLR 101 provides a service provider with unified user provisioning and service profile management interface, which is shared across protocols. The first embodiment of the MP HLR 101 includes common data types, a common source of data, and common control procedures that are centralized and projected in different formats to different network types to support user mobility across the different network types. Using this provisioning interface, a service provider may, for example, manage the profiles of different network types for a single user.

A database component 201 comprises user locations 203, integrated user profiles 205, and security information 207 as well as access procedures used by a database manager 209 to access the data via one or more connections to the database component 201. In the preferred embodiment, the database component 201 comprises at least one relational database. Optionally, the database 201 may include information other than user locations, profiles, and security information, which data may not belong to any particular protocol or network, such as user data relating to other applications. Each data element includes information to sustain all network protocols that the MP HLR supports. Unified management of user location information 203 facilitates call delivery between different types of networks. Unified management of security information 207 facilitates authentication between different types of networks.

The integrated user profile database 205 of the MP HLR 101 keeps the profile of users who have access capabilities to one or more network types. A service provider may uniformly manage the profiles of different network types for a single user through the MP HLR 101. The integrated user profile database 205 also includes common user data, e.g., user name, user identification, and directory number for a user, and common service information, e.g., call forwarding directory numbers, that are shared. The integrated user profile 205 in the MP HLR 101 further plays a broader role as a central repository of user and service data. Currently, various data is scattered between somewhat separate components of the network, such as the HLR, SCP, and AAA. The MP HLR 101 promotes the simplification and consolidation of these complex interconnected components into a single repository of subscriber and service data, upon which feed multiple services and applications.

The database manager 209 uses common procedures and exchanges common control commands and operations with one or more protocol gateways (PG), performs interworking functions across multiple different protocols, and manages, accesses, and updates data stored in the database 201. The database manager 209 provides services as a user location database 203 manager, an integrated user profile database 205 manager, and a security database 207 manager. The user location database 203 manager keeps track of the location of a user who may be at cellular terminals and/or at IP terminals. The information is used for delivery of voice call, data session, and a short message to a user. The security database 207 manager manages user authentication control for wireless as well as IP systems. The user profile database 205 manager manages integrated user profile database and exposes the MP HLR database management interface to other functionalities of the database manager 209. In the preferred embodiment, the database manager 209 comprises a plurality of core servers that access the database 201 through one or more connections.

The database manager 209 and database 201 may be considered a single database entity. When a PG queries the database, the PG sends the queries to the database manager 209 to obtain the relevant information from the database. The database manager 209 may be a database application such as Database Views that provides, for example, SQL (Structured Query Language) or LDAP (Lightweight Directory Access Protocol) queries to the database element 201.

The database manager 209 interfaces with a number of protocol gateways. Each protocol gateway (PG) receives messages, including requests and queries, from a particular network. The PG may relay the message if no further processing is required, interpret and/or translate the message, and/or generate one or more queries that are sent to the database 201 via the database manager 209. All PGs utilize the same set of common procedures and commands when querying the database manager 209. The PGs uses common procedures to convert network messages into common commands or operations, such as the examples shown in TABLE 1 below. In other words, the same set of common messages is utilized between each PG and the database manager 209, regardless of the protocol supported by the PG. For example, the MP HLR 101 utilizes a Register Terminal message when an ANSI network sends a Registration Notification, when a GSM network sends an Update Location, and when an SIP network sends a Register (Location Lookup) message. In another example, the MP HLR 101 utilizes a Request Location message when an ANSI network sends a Location Request, when a GSM network sends a Send Routing Information message, and when an SIP network sends an Invite message.

In the preferred embodiment, each protocol gateway supports a single network and the protocol that network utilizes, and translates or interprets messages from that protocol to one of the common messages, such as commands or operations. Examples of PGs shown in FIG. 2 include a GSM PG 211 supporting a GSM network 103, an ANSI-41 PG 213 supporting an ANSI-41 network 117, a AAA PG 215 supporting a AAA (RADIUS) server 135, an SIP PG 217 supporting a SIP server 137, and an H.323 PG supporting an H.323 server 139. The various wireless networks and wire line servers that are shown are examples only, as additional networks, both wire line and wireless, voice, data (packet or circuit based), and/or multimedia, and so forth, may be additionally included in the MP HLR.

The MP HLR 101 may also include one or more application gateways (AGs), such as the one 221 shown in FIG. 2. The AGs provide an interface through which information in the MP HLR 101 is accessed and notification of events, such as a mobile unit powering on or arrival of a mobile at a certain location, may be received. The AGs utilize the same common procedures, commands, and operations to access the database that the PGs utilize, including interpreting messages and requests from the application server 147 and generating queries to the database manager 209 and relaying the database 201 responses to the application server 147.

The AGs 221 include one or more APIs (Application Programming Interfaces) that interface to one or more application servers 147. The AGs may support management APIs and programming APIs for the MP HLR 101. Typically, AGs provide services through a non-standard interface. A provisioning AG provides service providers with an interface to provision user profiles through web-based interfaces as well as CORBA (Common Object Request Broker Architecture) based programming interface to the provider's provisioning center. Other types of interfaces such as LDAP may be sought when needed by introduction of another type of AG. The interface may also be used by an end-user to update the user's database entries though a web browser, e.g., supplementary service activation, call forwarding number update, and prepaid service updates, in which case the AG acts as a web server. A mobility service AG provides third party software vendors with programming API for mobility services. The API may be used to develop location-based service systems for users with cellular and/or internet access capabilities. The AG is an independent logical entity and employs the MP HLR 101 common operation interface to communicate with the database manager 209 and integrated user profile database.

Figure 3:
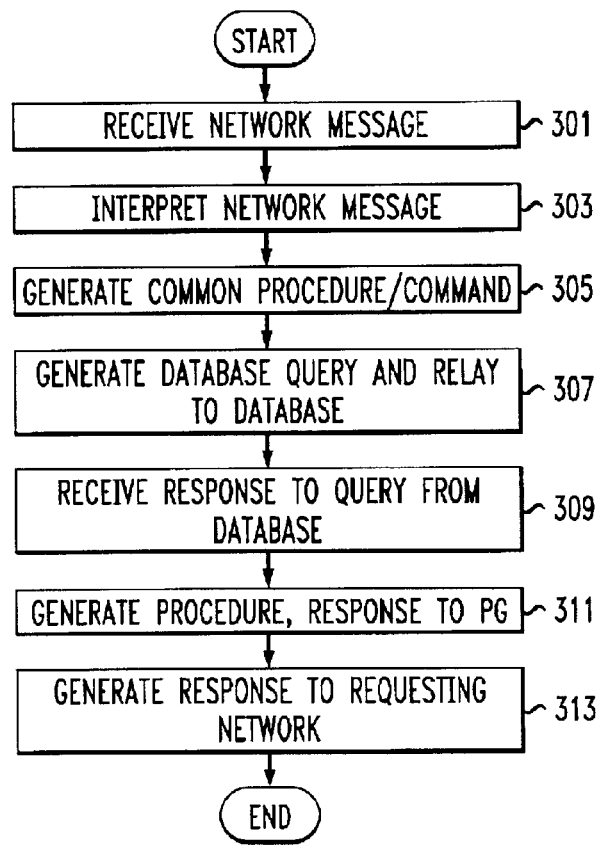
FIG. 3 is a flowchart showing operation of a protocol gateway in a multiple-protocol HLR in accordance with the invention.

A flowchart showing operation of a protocol gateway in an MP HLR is shown in FIG. 3. At step 301, a network message such as the examples shown in TABLE 1 below, as sourced by a network, is received. In the preferred embodiment, the protocol for the requesting network is terminated at the receiving step 301 by the PG. At step 303, the network message is interpreted by the PG. The message is interpreted according to rules associated with the network protocol under which the PG operates. These rules and the network protocol may comply with a communication standard, such as, for example, ANSI-41, GSM, SIP, H.323, AAA, and Mobile IP (M-IP), that supports the network protocol. At step 305, a common procedure is followed, and as appropriate a common command or operation is generated. In the preferred embodiment, the PG generates a common procedure or command, such as one shown in TABLE 1, based on the interpretation of the network message at step 303, and sends the common command or operation to the database manager 209. At step 307, one or more database queries are generated based on the network message and relayed to the database 201. In the preferred embodiment, the database manager 209 generates one or more queries based on the common procedure or command (which is based on the network message), and sends the queries to the database 201. At step 309, a response to the one or more queries is received from the database 201. In the preferred embodiment, the database manager 209 obtains the information from the database 201 by queries particular to the database 201 structures. At step 311, the database manager 209 utilizes a common procedure to generate a response based on the response received from the database 201. At step 313, the PG generates a response based on the response from the database manager 209 and sends that response to the requesting network that received the network message.

An example of a call flow that utilizes multiple protocol gateways in an MP HLR is shown in FIG. 2. The numbers in circles represent the call flow, in chronological order, for call delivery through an MP HLR 101. Although the example in FIG. 2 shows a GSM originating call that terminates in ANSI-41, calls may be delivered through any combination of originating and terminating networks. Generally, the call flow is described as follows. A message is received from a first network via a first protocol gateway. The message was generated, for example, because a call has been received for a mobile unit presently located in a second network. The message is processed according to a procedure common to the first protocol gateway and a second protocol gateway. At least one database query is generated based on the processed message. The at least one database query is relayed to a database comprising data common to a first network associated with the first protocol gateway and a second network associated with the second protocol gateway. A response to the at least one database query is received, and a request to the second protocol gateway is generated. In the preferred embodiment, the response identifies a location for a mobile unit, both physical and logical, and this information identifies the second protocol gateway. A reply to the request to the second protocol gateway is received, which reply may include, for example, routing information within the second network. A message based on the reply is generated and relayed to the first protocol gateway. The information in the message, particularly routing information, is utilized to route a call to a mobile unit located in a coverage area of the second network.

More specifically, the call flow of FIG. 2 is described as follows. A (1) call, such as an IAM (Initial Address Message) or SIP invite, is delivered to the call processing entity governing the called party number. If the called party number is an SIP URL, the call is delivered to an SIP proxy. If the called party number is a GSM or ANSI-41 wireless phone number, the call is delivered to a GSM GMSC or an ANSI-41 home MSC, respectively. An appropriate (2) location query message, such as a Location Request for ANSI, a Send Routing Information for GSM (as shown), or an SIP location lookup, is sent to the corresponding PG 211 from the originating network. The PG 211 translates the location query message into a (3) request location message that is relayed to the database manager 209. The database manager 209 processes the request into a (4A) database query that is relayed to the database 201, which determines the requested information and relays that (4B) requested information back to the database manager 209.

The database manager 209 looks up the user's location database to determine the current location of the user. The database manager 209 sends a (5) request route information message through the PG 213 that manages the network where the user is currently located or roaming, i.e., the terminating network. That PG 213 contacts an entity within the terminating network to (6) obtain routing information for that user. For example, a Route Request is sent to an ANSI MSC (as shown in the example in FIG. 2) or a Provide Roaming Number (PRN) message is sent to a GSM MSC. A (7) routing return message, such as a route request with a TLDN (Temporary Location Directory Number) from an ANSI-41 MSC (as shown in FIG. 2), a PRN ACK with an MSRN (Mobile Subscriber Roaming Number) from GSM MSC, or routing information used to reach a signaling and media gateway complex that has SIP user agent functionality for a call from an SIP network via the PSTN, is returned to the terminating PG 213. The PG 213 processes the routing return message into a (8) requested route information response that is relayed to the database manager 209. The database manager 209 processes the requested route information response into a (9) request location response, including the relevant information from the routing return message, and sends the request location response to the PG 211 for originating call processing entity. The PG 211 converts the request location response to an appropriate (10) network response, such as a location request for ANSI, an SRI ACK for GSM (as shown in FIG. 2), or an SIP location lookup response for SIP. The originating network relays the (11) call (IAM or SIP invite) to a device in the terminating network that delivers the (12) call to the appropriate end user.

Figure 4:
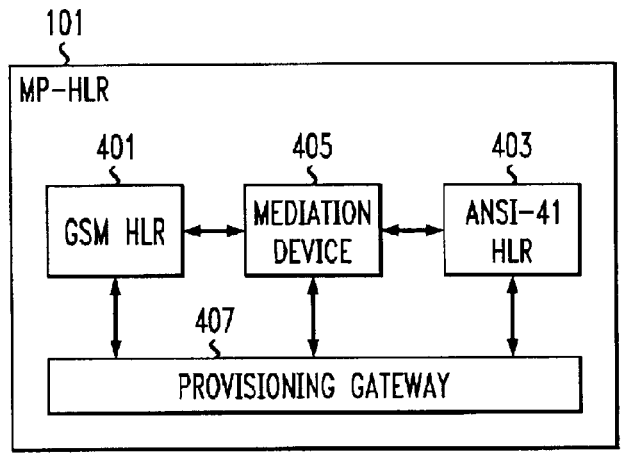
FIG. 4 is a block diagram of a second embodiment of a multiple-protocol HLR in accordance with the invention.

A block diagram of the second embodiment of a multiple-protocol HLR is shown in FIG. 4. This embodiment of the MP HLR 101 includes an HLR for each type of wireless communication system and a server for each type of wireline network supported by the MP HLR 101. In the particular example shown, a GSM HLR 401 and an ANSI-41 HLR 403 are shown. Each of the HLRs 401 and 403 are interfaced to a mediation device 405. The mediation device (MD) 405 provides a number of functions, including generating network messages, translating network messages, and emulating GMSCs, VMSCs, and MCs. As part of the translation function, various tables including translation information are included in the MP HLR 101. An example of such a translation table is shown in TABLE 1, which translates messages between GSM and ANSI-41/ANSI-136. The MD may also convert messages. For example, the MD 405 may convert a Provide Roaming Number message to a Location Request message or a Routing Request message to a Send Routing Information message. When looking at conversion external to the MP HLR 101, the MP HLR 101 converts a Location Request message to a Provide Roaming Number message, and also converts a Send Routing Information message to a Routing Request message. The MP HLR 101 works with serving networks, i.e., networks where communication devices are currently registered, to update registration information, generate queries in response to requests, and route calls to users where they are located and in a manner that users access their communication devices, such as formatting profiles and messages according to the serving or terminating network's protocol. The MP HLR 101 routes a call according to the protocol of the infrastructure device to which the call is directed.

In this embodiment, a provisioning gateway 407 preferably distributes user data for each of the devices within the MP HLR 101. The provisioning gateway 407 is interconnected to a database (not shown) that is part of or external to the MP HLR 101, or distributed among one or more of the MP HLR 101 components. Only two HLRs are shown part of the MP HLR in FIG. 4 for the sake of simplicity. If additional HLRs or home agents were to be added to the MP HLR, each such device would be interfaced to the mediation device 405 and the provisioning gateway 407. The database includes user information such as user profile, locations, and security information, such as the data stored in the database 201 as described above. Other stored data includes protocol types and addresses for communication devices, serving networks, and infrastructure devices such as gateway MSCs, terminating MSCs, visited MSCs, packet gateways, and internet protocol gateways. This data may be distributed as needed among the elements that require the information or may be stored for access as needed at various devices, such as the provisioning gateway 407 or the mediation device.

Various types of information flow and timing diagrams for the MP HLR 101 are shown in FIG. 5 through FIG. 19. These call flows may be utilized with the MP HLR of FIG. 2 or FIG. 4, although the flows of FIG. 5 through FIG. 17 are tailored to call flows within the MP HLR 101 of FIG. 4 in order to show the interactions between the various HLRs 401 and 403 and the mediation device 405, which interactions may not take place in the MP HLR 101 of FIG. 2.

Figure 5:
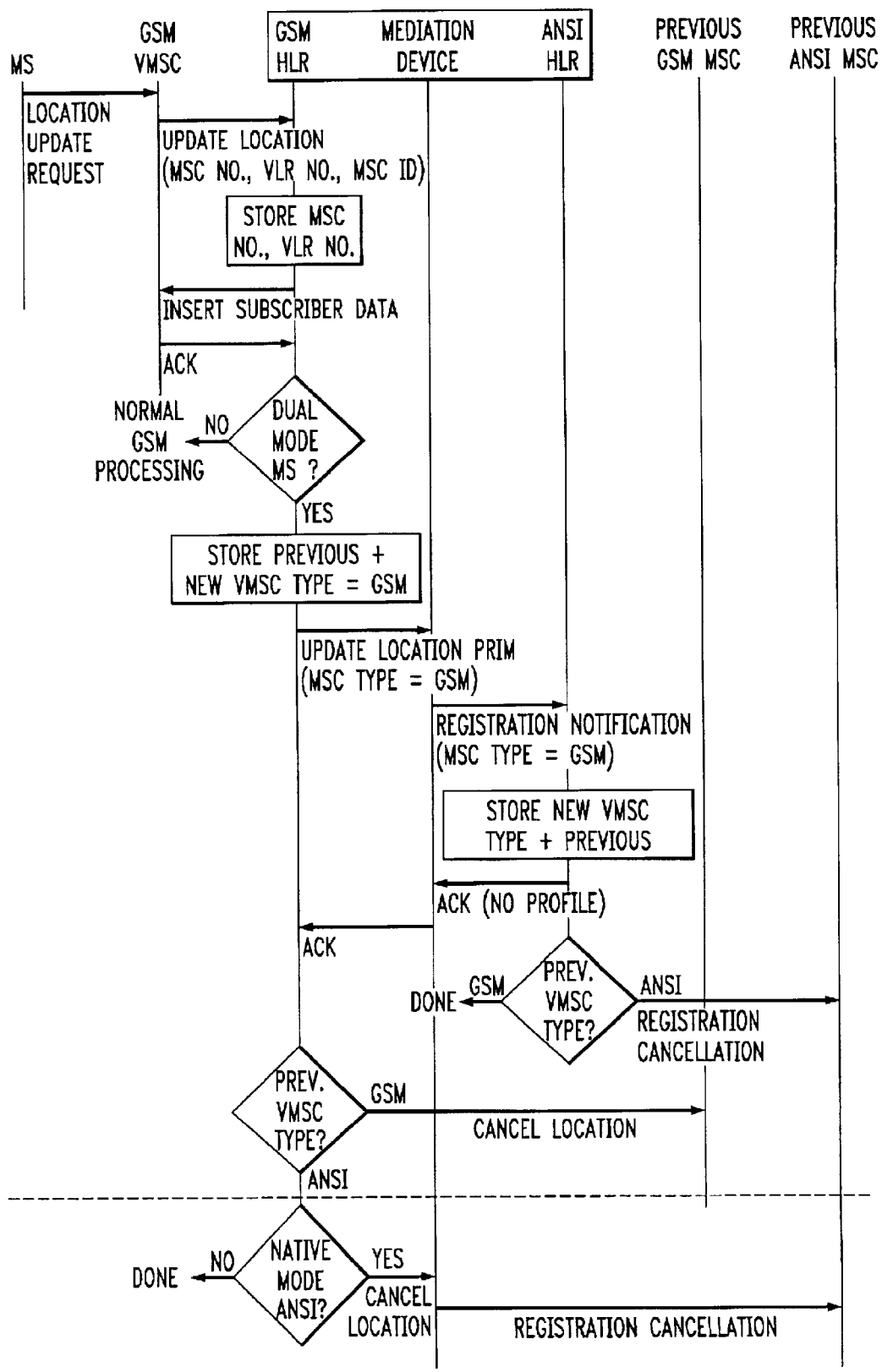
FIG. 5 is a flowchart and timing diagram showing GSM registration in native mode in accordance with the invention.

A flowchart and timing diagram showing GSM registration in native mode is shown in FIG. 5. The native mode of a communication device is typically the same as the protocol type of the service center, message center, VMS, or GMSC associated with the communication device. In single-mode HLRs, the native mode is often the same as the protocol type of the HLR or home agent associated with the communication device. Foreign modes are modes that are not the native mode. A location update request is relayed from a mobile station to a GSM VMSC. The update location, including MSC number, VLR number, and MSC ID is relayed to the GSM HLR 401 of the MP HLR 101. The GSM HLR stores the MSC number and VLR number and sends an insert subscriber data message to the GSM GMSC, which sends an ACK to the GSM HLR 401.

The GSM HLR 401 determines whether the mobile subscriber is a dual mode subscriber. When the mobile is not a dual mode subscriber, normal GSM processing is provided. When the mobile is a dual-mode mobile, the previous and new VMSC type of GSM is stored at the GSM HLR. An update location primitive (internal message) including an MSC type equal to GSM is sent to the mediation device, which converts the update location message to a registration notification message with an MSC type of GSM and relays that message to the ANSI HLR 403. The ANSI HLR stores the new VMSC type and the previous VMSC type and sends an ACK with no profile to the mediation device. A profile need not be sent because the mediation device has access to the profile information, thereby saving time and bandwidth by not sending the profile between the devices of the MP HLR 101. This ACK is relayed to the GSM HLR 401.

Upon receipt of the ACK, the GSM HLR 401 determines if the previous VMSC type is of the HLR's type, i.e., GSM. If the previous VMSC type is GSM, a Cancel Location message is sent from the GSM HLR 401 to the previous GSM MSC, which deletes its VLR for the mobile 105. Optionally, if the previous VMSC type is ANSI and the native mode of the MS is not ANSI, the process is completed, but if the previous type is ANSI and the native mode is also ANSI, a cancel location request is sent from the GSM HLR 401 to the mediation device 405, which converts the cancel location to a registration cancellation that is sent to the previous ANSI MSC, which deletes its VLR for the mobile 105. The ANSI HLR also determines if a previous VMSC type is ANSI. If the previous VMSC type is not ANSI, the process is done, otherwise an ANSI registration cancellation is sent from the ANSI HLR 403 to the previous ANSI MSC, and the process is complete.

Figure 6:
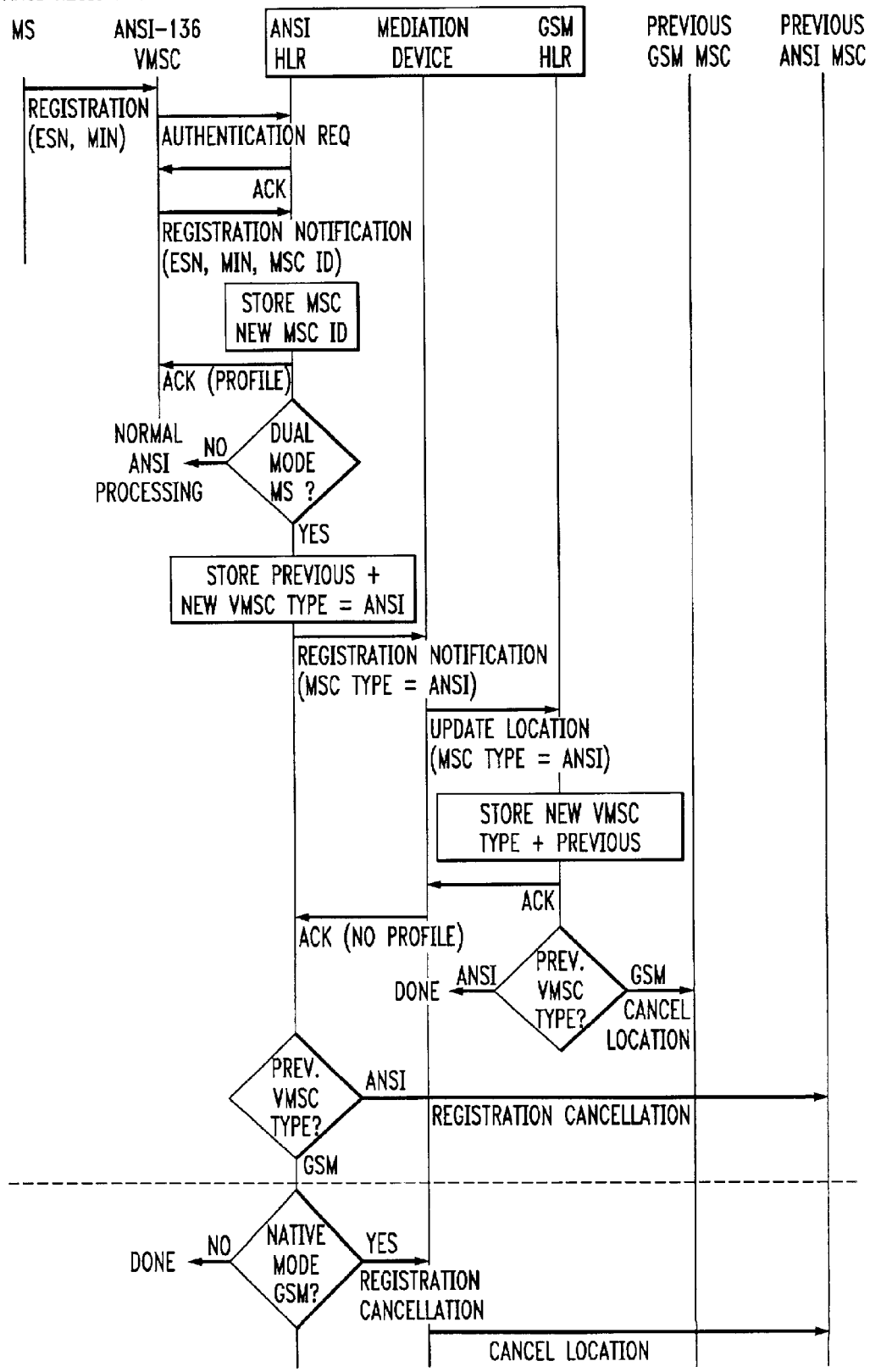
FIG. 6 is a flowchart and timing diagram showing ANSI registration in native mode in accordance with the invention.

A flowchart and timing diagram showing ANSI registration in native mode is shown in FIG. 6. A registration request with an Electronic Serial Number (ESN) and Mobile Identification Number (MIN) is sent to an ANSI-136 GMSC, which sends an authentication request to the ANSI HLR 403 of the MP HLR 101. An ACK is sent back to the ANSI GMSC, which sends a registration notification including the ESN, MIN, and MSC ID to the ANSI HLR 403. The ANSI HLR stores the new MSC ID and sends an ACK with a profile to the GMSC. The ANSI HLR 403 determines whether the mobile is dual mode. When the mobile is not dual mode, normal ANSI processing for the registration takes place, otherwise the ANSI HLR 403 stores a new VMSC type equal to ANSI plus the previous MSC type. The ANSI HLR sends a registration notification with an MSC type of ANSI to the mediation device 405, which converts the registration notification to an update location message with an MSC type of ANSI to the GSM HLR for processing. The GSM HLR 401 stores the new VMSC type and the previous MSC type and sends an ACK without a profile ACK to the mediation device, which relays the ACK to the ANSI HLR 403. The GSM HLR determines whether the previous VMSC type is of its type, i.e., GSM. If the previous VMSC type is not GSM, the process is complete, but if the previous VMSC type is GSM, a cancel location message is sent to the previous GSM MSC from the GSM HLR 401. The ANSI HLR determines if the previous VMSC type is ANSI, and if so, sends a registration cancellation message to the previous ANSI MSC. Optionally, when the previous VMSC type is GSM and if mobile is in its native mode, there is no further processing, but if the mobile's native mode is GSM, the ANSI HLR 403 sends a registration cancellation to the mediation device 405, which converts the registration cancellation to a cancel location request that is sent to the previous GSM MSC, and the process ends.

Figure 7:
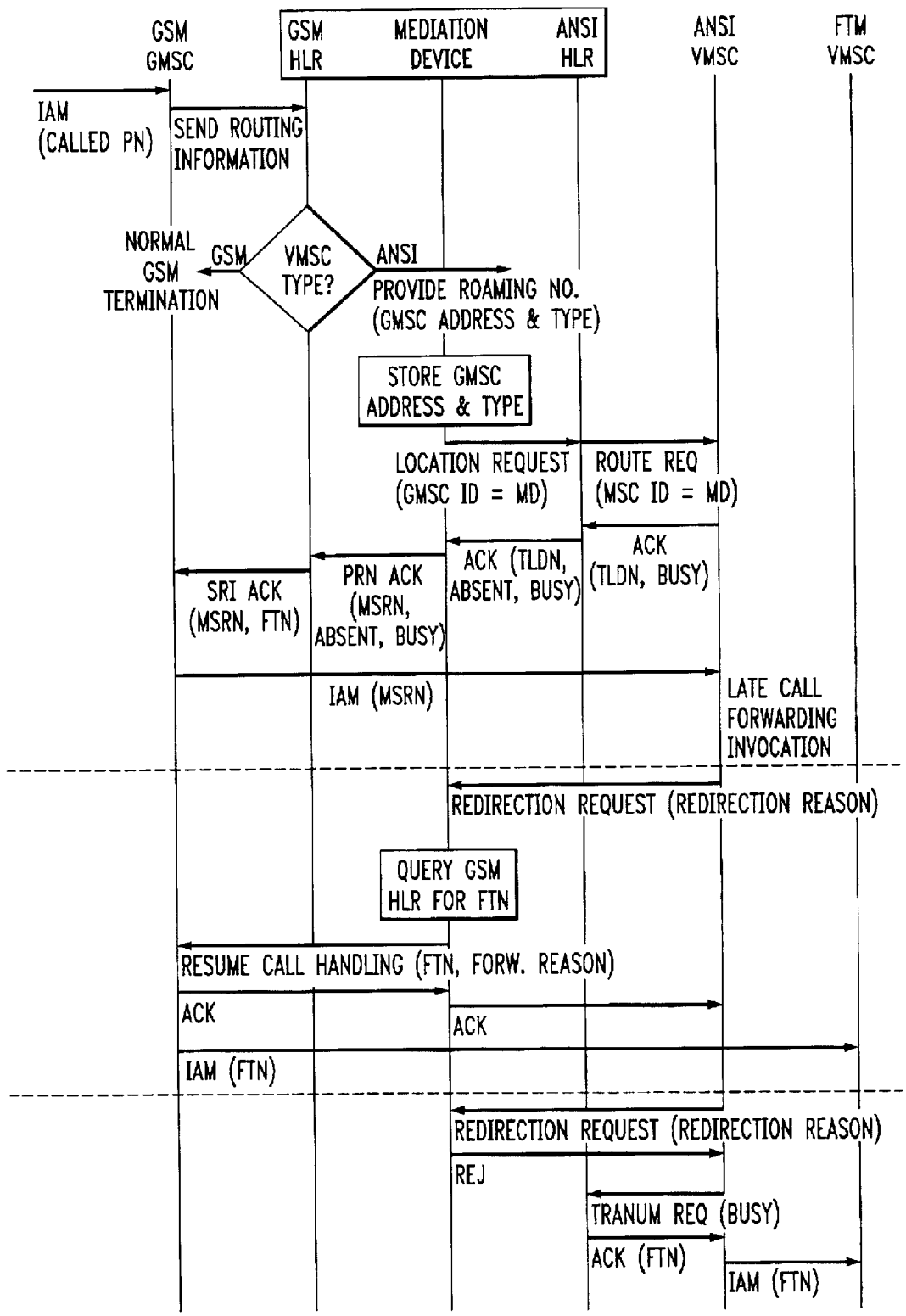
FIG. 7 is a flowchart and timing diagram showing call delivery originated in GSM and terminated in ANSI in accordance with the invention.

A flowchart and timing diagram showing call delivery originated in GSM and terminated in ANSI is shown in FIG. 7. An IAM including a called party number (PN) is sent to a GSM GMSC, which sends routing information to the GSM HLR 401 of the MP HLR 101. The GSM HLR 401 determines the VMSC type for the called party. When the type is GSM, normal GSM termination is provided. When the type is not GSM, the GSM HLR relays a provide roaming number messages with the GMSC address and type to the mediation device 405. The mediation device 405 stores the GMSC address and type, converts the provide roaming number message to a location request with the GMSC ID equal to the mediation device (MD), and sends the message to the ANSI HLR 403.

The ANSI HLR sends a route request message to the ANSI VMSC with an MSC ID of MD indicating the mediation device 405. The ANSI VMSC sends an ACK including a TLDN or busy ACK to the ANSI HLR 403, which relays an ACK with a TLDN, absent, or busy to the mediation device 405. A PRN ACK with an MSRN, absent, or busy is relayed to the GSM HLR, which generates a SRI ACK including the MSRN or FTN and the IAM with the MSRN is relayed from the GSM GMSC to the ANSI VMSC processing to the mobile station. In this example, a late call forwarding invocation by the MS prevents the call from being completed from the ANSI VMSC. In one embodiment, a redirection request including a redirection reason is relayed from the ANSI VMSC to the mediation device, which queries the GSM HLR for the FTN (Forward To Number). A resume call handling message including the FTN and forwarding reason is sent to the GSM GMSC, which sends an ACK to the mediation device, which sends an ACK to the ANSI VMSC, and the IAM with the FTN is sent to the FTN VMSC. This method is advantageous because, by granting the mediation device 405 access to the FTN, processing for call forwarded communications takes place at the originating GMSC, which saves trunking resources. Alternatively, the redirection reason may be relayed to the mediation device 405, which rejects the redirection request, causing a TRANUM (Transfer Number) request with a busy to be sent to the ANSI HLR. The ANSI HLR sends an ACK to the ANSI VMSC with the FFN, and the ANSI VMSC relays the IAM message with the FTN to the FTN VMSC. This method is advantageous because processing for call forwarded communications takes place between the MP HLR 101, and in particular the mediation device 405, and the terminating mobile switching center without having to involve the originating MSC, which may not have the ability to process a Resume Call Handling (RCH).

Figure 8:
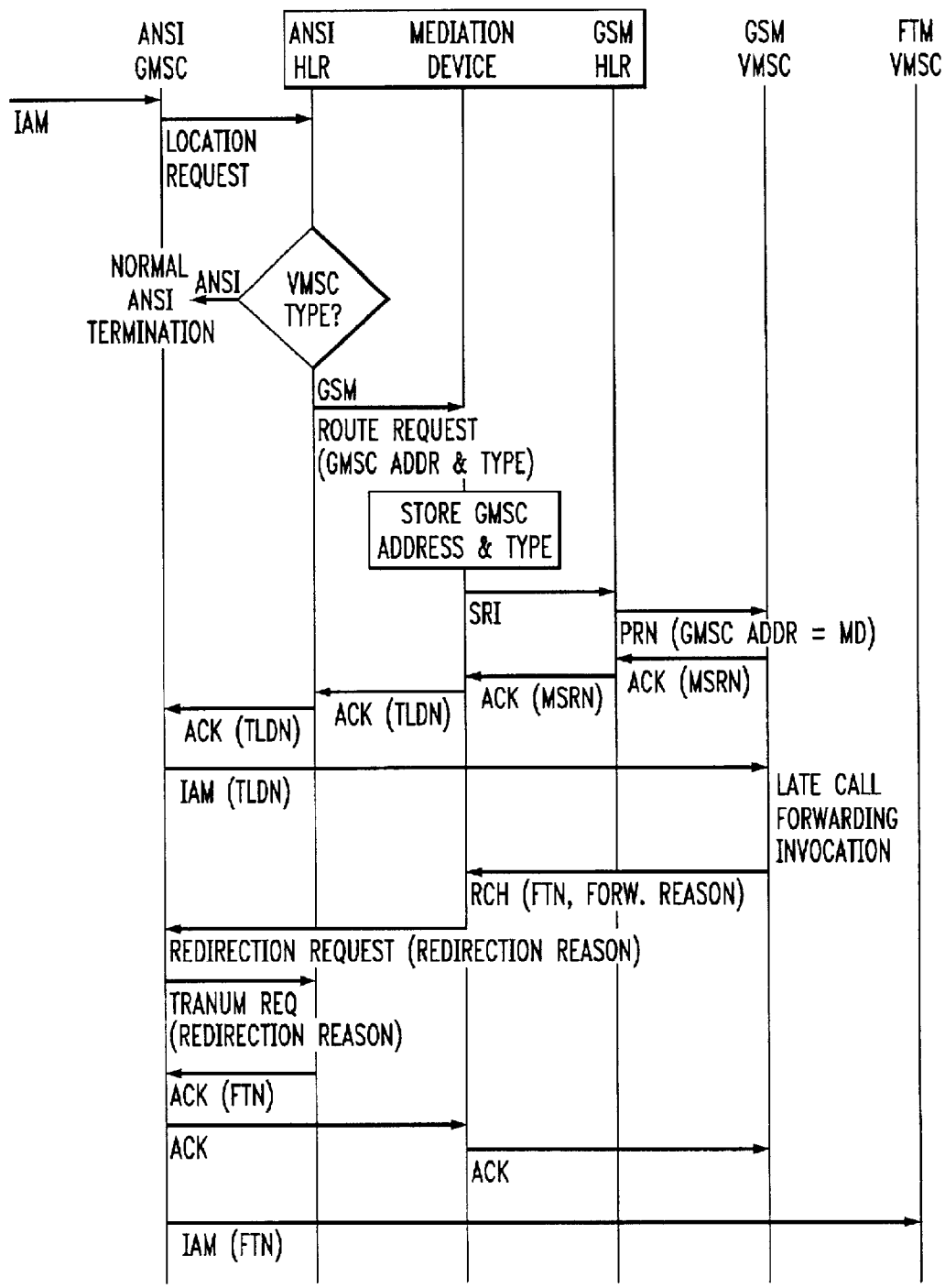
FIG. 8 is a flowchart and timing diagram showing call delivery originated in ANSI and terminated in GSM in accordance with the invention.

A flowchart and timing diagram showing call delivery originated in ANSI and terminated in GSM is shown in FIG. 8. An IAM is relayed to an ANSI GMSC, which sends a location request to the ANSI HLR 403. The ANSI HLR 403 determines whether the VMSC type is ANSI or GSM. When the type is ANSI, normal ANSI termination is provided. When the type is GSM, a route request including the GMSC address and type is relayed to the mediation device 405. The mediation device 405 stores the GMSC address (which is useful for optimal routing for late call forwarding) and the GMSC type (which is useful for Intelligent Networking (IN) interaction), and sends an SRI to the GSM HLR 401. The GSM HLR 401 issues a PRN including a GMSC address equal to the MD and sends it to the GSM VMSC, which relays an ACK with the MSRN to the GSM HLR 401, which relays the ACK with MSRN to the mediation device 405. The mediation device converts the ACK with an MSRN to an ACK with a TLDN that is relayed to the ANSI HLR 401 and to the ANSI GMSC, which relays the IAM with the TLDN to the terminating GSM VMSC. In this example, a late call forwarding invocation by the MS prevents the call from being completed from the ANSI VMSC. The GSM VMSC sends an RCH (Resume Call Handling) including an FTN and forwarding reason to the mediation device 405 that converts the RCH to a redirection request including a redirection reason that is relayed to the ANSI GMSC, which requests a forward-to number from the ANSI HLR by sending a TRANUM request, and receives the FTN in the response, acknowledges the redirection request to the Mediation Device, and sends the IAM to the FTN VMSC. The MD acknowledges the RCH, and the process ends. This method is advantageous because, by granting the mediation device 405 access to the FTN, processing for call forwarded communications takes place between the MP HLR 101, and in particular the mediation device 405, and the originating gateway mobile switching center without having to involve an extra trunk between the originating MSC and the terminating MSC.

Figure 9:
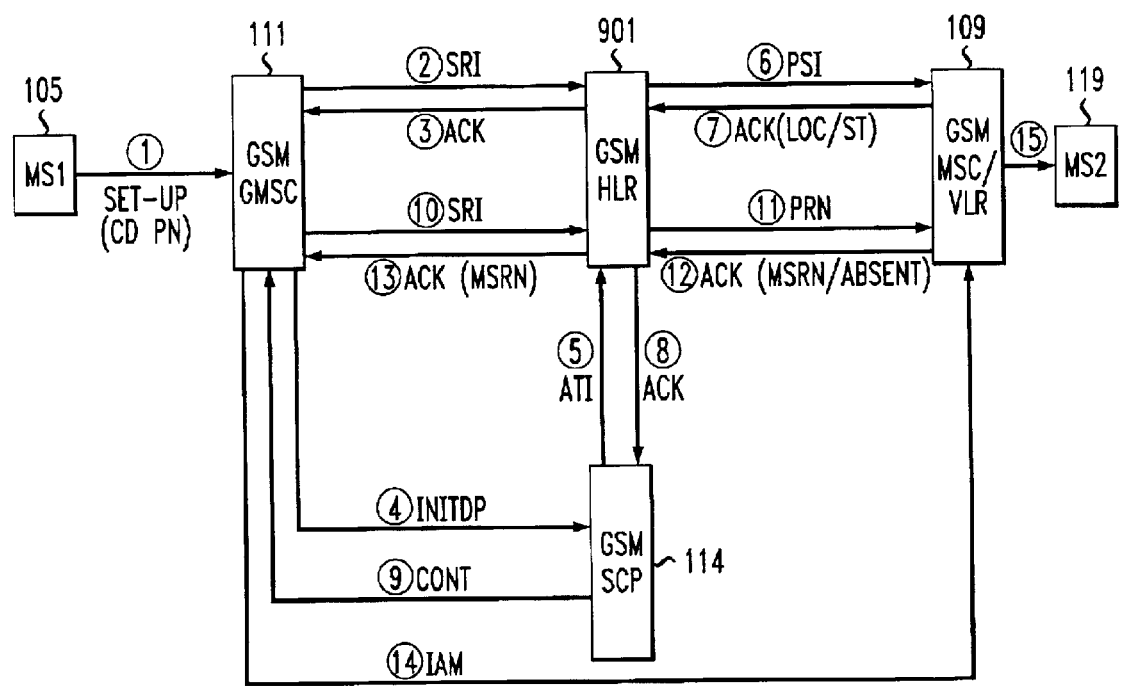
FIG. 9 is a block diagram with a signal flow for a GSM terminated call with terminating prepaid triggers.

A block diagram with a signal flow for a GSM terminated call with terminating prepaid triggers, as known in the art, is shown in FIG. 9. A first mobile MS1 105 elects to communicate with a second mobile MS2 119 that is a prepaid mobile user. In this example, the GSM GMSC 111 exchanges information with the GSM HLR 901, which communicates with the GSM SCP 114 to verify service for the particular user. Once the service is verified by the SCP 114, the HLR 901 proceeds with call handling through the GSM MSC/VLR, where the call is terminated with the second mobile 119.

Figure 10:
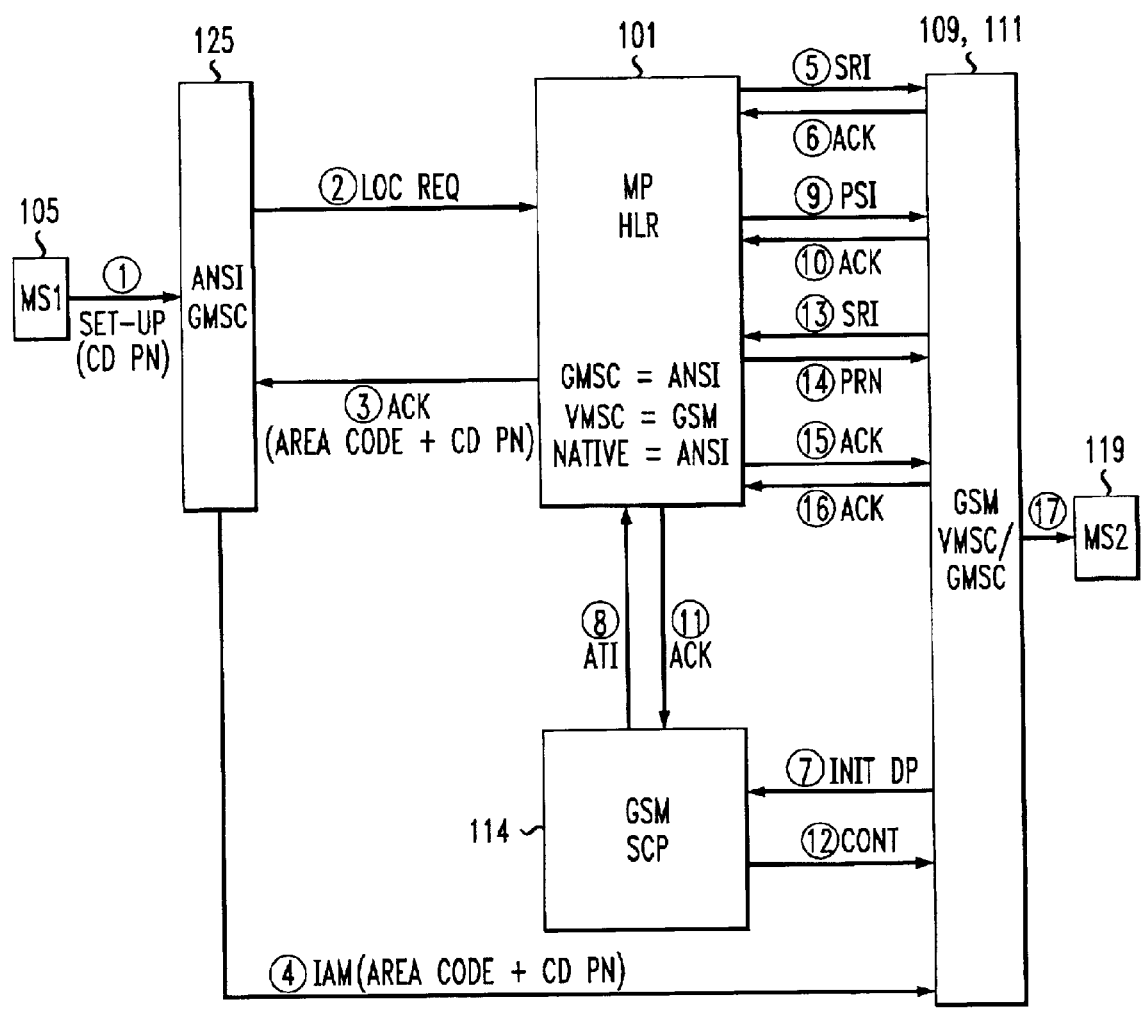
FIG. 10 is a block diagram with a signal flow for a GSM foreign mode terminated call utilizing a MP HLR in accordance with the invention.

A block diagram with a signal flow for a GSM foreign mode terminated call utilizing an MP HLR is shown in FIG. 10. For prepaid users, ANSI systems communicate with an SCP at the terminating MSC, whereas GSM systems communicate with an SCP at the (originating) GMSC. In the example shown, the first mobile 105 originates a call to a second mobile that utilizes prepaid service. The called party number (CD PN) is relayed to the ANSI GMSC 125, and a location request is relayed to the MP HLR 101. Because the MP HLR 101 knows the GMSC is ANSI, the VMSC is GSM, and the native mode of the mobile 105 is ANSI, the MP HLR 101 directs the call through the ANSI GMSC 111 to one of either the coupled terminating GSM VMSC/GMSC 109, 111 or a GMSC of the same protocol type as the VMSC, where normal GSM prepaid termination for the call takes place between the VMSC/GMSC 109/111, the MP HLR 101, and GSM SCP 114. Directing the call to the GMSC coupled with the VMSC has the advantage of saving trunking resources. When the mediation device directs a call to a destination GMSC, the mediation device is able to send a called party number that may be different than the original called party number. The receiving GMSC must, however, recognize the called party number (which may include one of either a prefix followed by the original called party number or a different number). Directing the call to the GMSC of the same protocol type as the VMSC has the advantage that this GMSC may be in the same network as the ANSI GMSC 111 and is thus able to recognize one of either a prefix followed by the original called party number or a different number. Similarly (see FIGS. 16, 17, and 18), when the mediation device 405 directs a Short Message to an SMSC/MC, the mediation device is able to both recognize and generate a called party number that may be different than the original called party number. The SMSC/MC and VMS must, however, recognize the called party number (which may include one of either a prefix followed by the original called party number or a different number).

Figure 11:
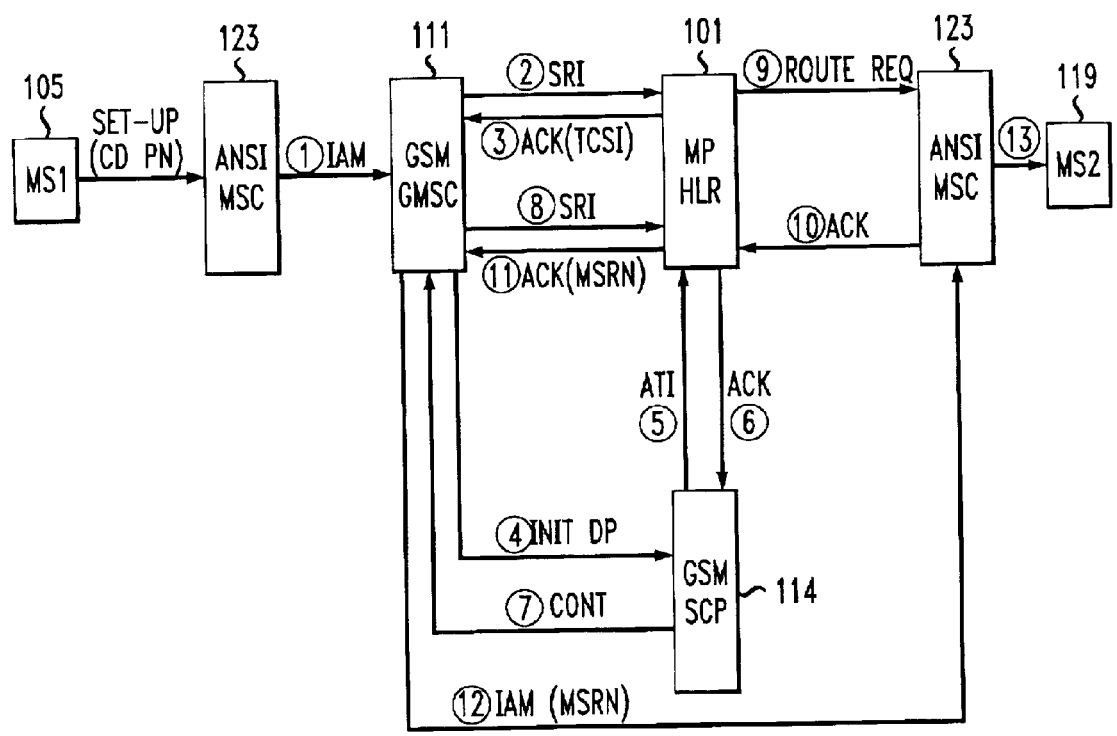
FIG. 11 is a block diagram with a signal flow for an ANSI foreign mode terminated call utilizing a MP HLR in accordance with the invention.

A block diagram with a signal flow for an ANSI foreign mode terminated call utilizing an MP HLR is shown in FIG. 11. In this situation, the first mobile 105 originates a call, utilizing prepaid service, to a second mobile 119. An IAM is received at an ANSI MSC 123, which sends the IAM message to a GSM GMSC 111 that queries the database 101. The call is set up between the GSM GMSC 111, MP HLR 101, and GSM SCP (that determines payment authorization), and the GMSC 111 relays the IAM with the MSRN to the ANSI MSC that terminates the call with the second mobile 119.

Figure 12:
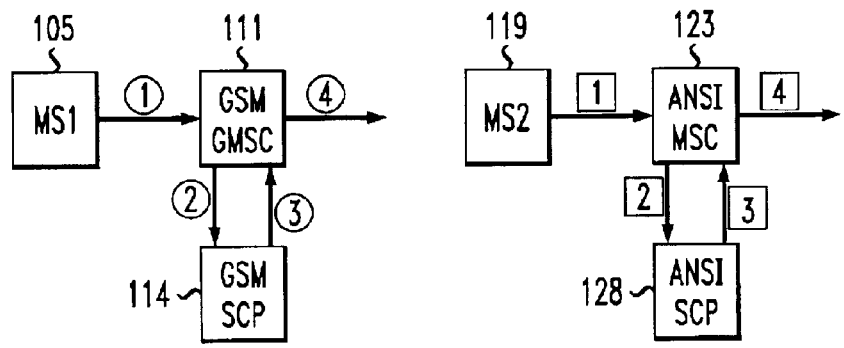
FIG. 12 is a block diagram with a signal flow for a mobile originated prepaid calls in accordance with the invention.
Figure 13:
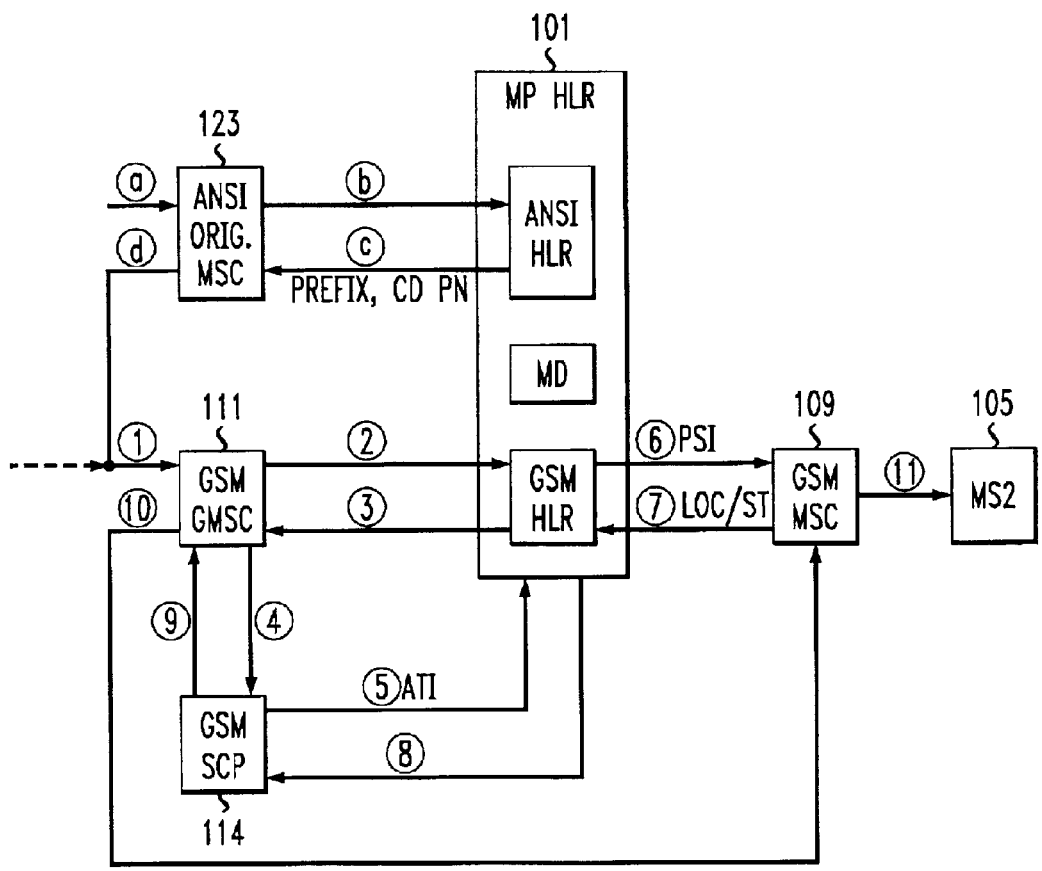
FIG. 13 and FIG. 14 each show a block diagram with a signal flow for a mobile terminated prepaid call utilizing a MP HLR in accordance with the invention.
Figure 14:
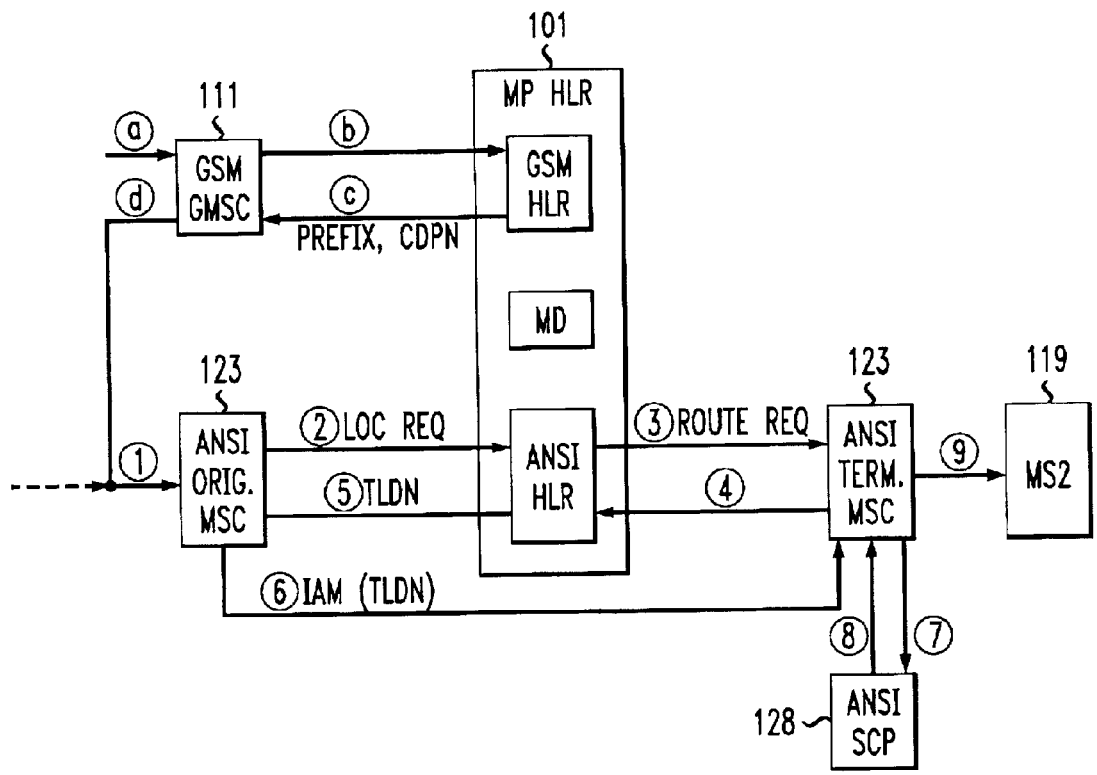

A block diagram with a signal flow for mobile originated prepaid calls is shown in FIG. 12. In the event that there is no combined SCP, the mobile is able to have multiple SCPs (one per each protocol) and communication between the SCPs is optional. In these cases, mobile originating prepaid service is utilized. For mobile terminated prepaid calls, the MP HLR 101 relays the call to the appropriate GMSC or ANSI terminating MSC which communicates with the appropriate SCP, as shown in FIGS. 13 and 14. In these cases, mobile terminating prepaid service is utilized.

A block diagram with a signal flow for mobile terminated prepaid call with GSM termination is shown in FIG. 13 for one of either native or foreign mode. In this example, operations with the MP HLR are shown for the case when the MP HLR 101 of FIG. 4 is utilized. When the terminating mobile operates in foreign mode compared to the originating MSC, the process (a) through (d) goes through the ANSI originating MSC 123 through the ANSI HLR 403 in the MP HLR 101, which routes the call ACK through the originating MSC 123 and to the GSM GMSC 111 for completion of processing via signal flow (1) through (11). When the mobile operates in its native GSM mode, the process originates (1) at the GSM GMSC 111. The call proceeds through set-up between the GSM GMSC 111 and the GSM HLR 401, which authorizes service through the GSM SCP 114, and the call is terminated by the GSM MSC 109 to the second mobile 105.

A block diagram of the signal flow for mobile terminated prepaid call with an ANSI termination is shown in FIG. 14 for one of either native or foreign mode. When the terminating mobile operates in foreign mode compared to the originating MSC, the call process (a) through (d) goes through the GSM GMSC 111 through the GSM HLR 401 and back through the GSM GMSC 111 to the ANSI originating MSC 123 for completion of processing via signal flow (1) through (9). When the mobile operates in its native mode, the process begins (1) at the ANSI originating MSC 123. The ANSI originating MSC 123 sends a location request to the ANSI HLR 403, which sends a route request to the terminating ANSI MSC and the call flow proceeds as a normal ANSI originated and terminated call for a prepaid user.

Figure 15:
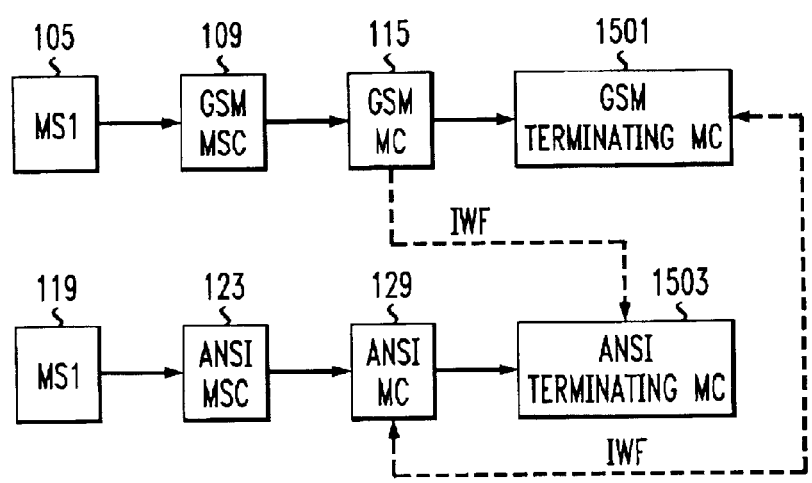
FIG. 15 is a block diagram with a signal flow for mobile originated short messaging service (SMS) in accordance with the invention.

A block diagram with a signal flow for a mobile originated SMS is shown in FIG. 15. A mobile originates SMS at its native MSC, which operates with the native protocol MC (Message Center), also known as a Service Center (SC) or an SMSC (Short Messaging Service Center), and terminates the service with a terminating MC 1501 or 1503 for that particular protocol. If the message terminates in a different protocol, a medication device acting as an IIF (Interworking and Interoperability Function) is used to convert the message to the other protocol, which converted message is relayed to the terminating message center 1501 or 1503.

Figure 16:
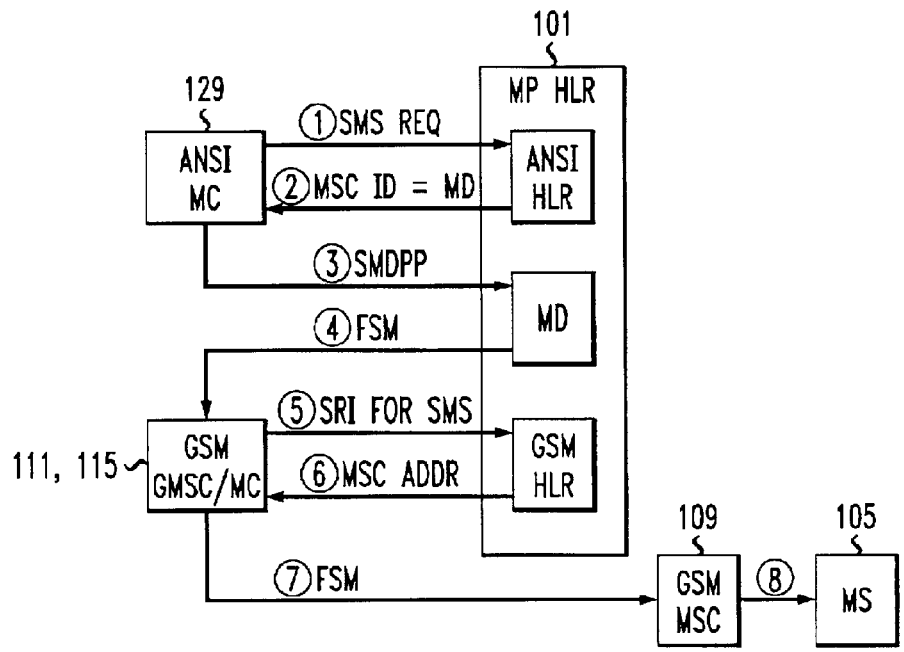
FIG. 16, FIG. 17, and FIG. 18 each show a block diagram with a signal flow for mobile terminated SMS utilizing a MP HLR in accordance with the invention.
Figure 17:
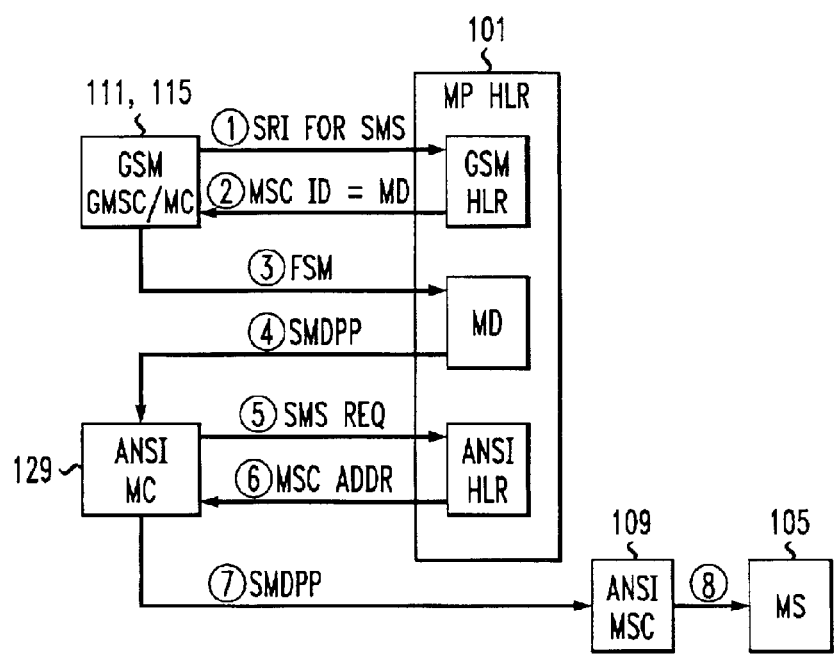

A block diagram with a signal flow for a mobile terminated SMS using an MP HLR is shown in FIG. 16 and FIG. 17. In the example of FIG. 16, an ANSI native mode SMS message, is terminated in GSM foreign mode. The message is relayed to the ANSI HLR, which provides the mediation device 405 as MSC ID to the ANSI message center (MC) 129, which works with the mediation device 405 to generate an FSM (Forward Short Message) that is sent to the GSM MC 115. The GSM GMSC/MC works with the GSM HLR 401 to relay the message to the GSM MSC 109, which sends the message to the target mobile 105. In the example of FIG. 17, a GSM native mode SMS message is terminated in ANSI foreign mode. The message is relayed to the GSM HLR, which provides the mediation device 405 as MSC ID to the GSM MC, which works with the mediation device 405 to generate an SMDPP (Short Message Direct Point to Point) that is sent to the ANSI MC. The ANSI MC works with the ANSI HLR to relay the message to the ANSI MSC, which sends the message to the target mobile 105.

Figure 18:
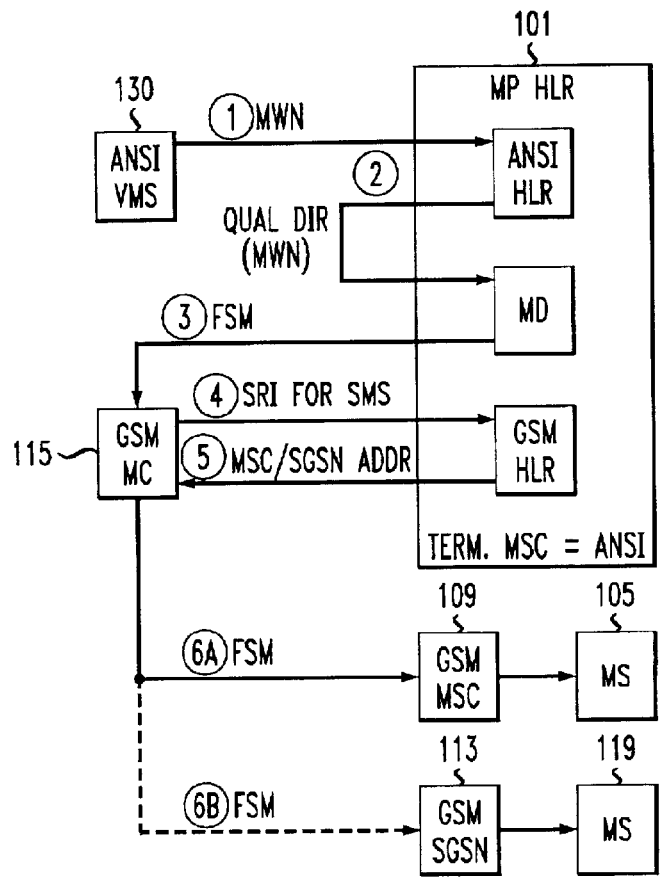

A block diagram with a signal flow for an ANSI VMS (Voice Message System) Message Waiting Notification procedure. The MP HLR 101 generates a GSM mobile terminated SMS utilizing an MP HLR, in particular a mediation device, for an ANSI native mode terminating in GSM native mode is shown in FIG. 18. The ANSI VMS 130 sends an MWN (Message Waiting Notification) to an ANSI HLR, which communicates with the mediation device 405 to send an FSM to the GSM MC 115, that operates with the GSM HLR to relay the message to the appropriate GSM MSC 109 or GSM SGSN 113 for termination with the appropriate mobile 105 or 119. In the situations shown in FIG. 16 and FIG. 17, the MP HLR 101 knows the terminating MSC type, and is thus able to immediately direct the call to the appropriate message centers, thereby avoiding excess translation of messages through the MD 405. The GSM MC and/or ANSI MC functionality may be co-located within the MP HLR 101.

Figure 19:
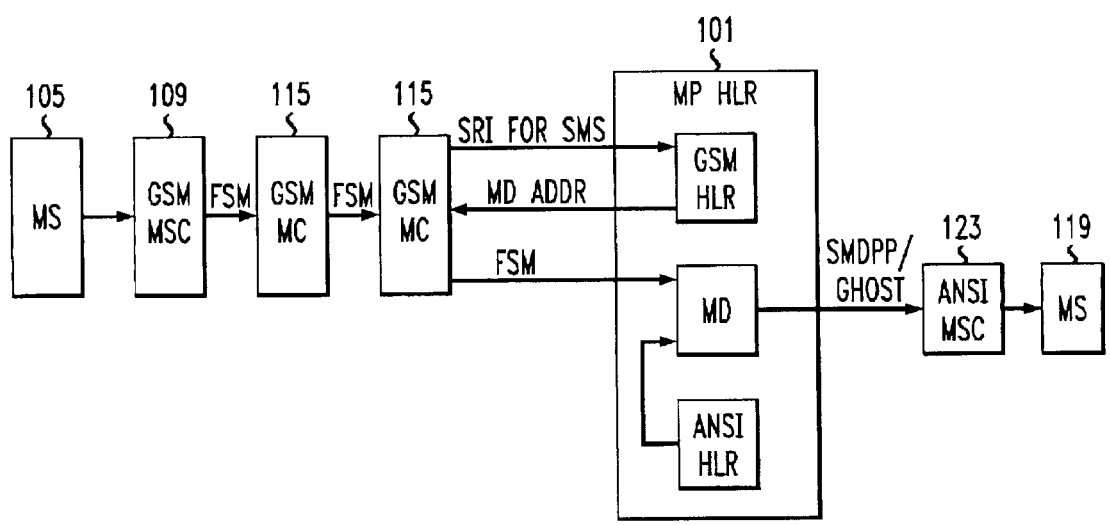
FIG. 19 is a block diagram with a signal flow for mobile originated and terminated SMS in accordance with the invention.

A block diagram with a signal flow for mobile originated and terminated SMS is shown in FIG. 19. An SMS message from an MS 105 to the GSM MSC 109 is routed to the GSM MC 115, regardless of the native mode of the Called Party. The GSM MC 115 routes the SMS message to the appropriate MC for termination, which is an ANSI MC 129 in this case. The ANSI MC 129 relays an FSM to the MD 405, which converts or translates the message to the desired protocol, e.g., from GSM to ANSI, and returns the MD address with the converted message. The ANSI MC 129 sends an SRI (with the MD address) to the ANSI HLR 403, which relays the message to the MD 405, which effectuates, for example via SMDPP or GHOST (GSM HOsted SMS Teleservice), termination from the ANSI MSC 123 to the end mobile 129. Utilizing the MP HLR 101 in this manner maximizes SMS conversion to one conversion for any call, no matter what the native protocol, originating protocol, or terminating protocol is.

With the MP HLR solution, the called party may have two MCs, one GSM and one ANSI. The VMSC routes the originating SMS message to the MC of its same protocol type, regardless of the subscriber's native mode. Whenever possible the originating MC routes to the called party's MC of the same protocol type. When the called party is not a dual mode subscriber, the call is routed to a mediation device 405 for protocol conversion to its native mode. Likewise, if the dual mode called party is operating in foreign mode, the foreign mode MC sends the SMS message to an MD for protocol conversion to the terminating MSC.

An MP HLR 101 is more efficient than an Interoperability Interworking Function (IIF) for a number of reasons. No mapping is required for profile information and less external network signaling is required for cross-technology registration because messages may be sent directly to the MP HLR 101. Call termination is more optimal because the originating MSC may query an HLR of the terminating technology through the mediation device, without having to route the call to the home network. Optimal routing, particularly for late call forwarding, reduces international trunking in MP HLR 101 applications. SMS conversions are maximized at one, regardless of the originating or terminating user's protocol with the MP HLR 101. Although ANSI systems communicate with an SCP at the terminating MSC, and GSM systems communicate with an SCP at the (originating) GMSC, the MP HLR 101 provides for termination triggers for ANSI subscribers operating in GSM foreign mode.

The present invention provides a single HLR that supports multiple protocols of various types, including wireless and/or wireline and voice, data, and/or multimedia. The MP HLR replaces HLRs, home agents, and foreign agents for a number of network protocols. The MP HLR performs mobility/user location management, user authentication/security control, and user profile management functions for various different network protocols. These functions are required in traditional cellular networks, $3^{rd}$ generation wireless voice and data networks, and the internet, and have been previously deployed over separate functional entities. The MP HLR 101 embodies these functions of different entities in one entity by supporting multiple standard protocol interfaces. With multiple-protocol support, the MP HLR 101 promotes seamless evolution from today's first generation and second generation wireless networks based on a single HLR supporting a single network protocol to next generation wireless networks based on an HLR/IP server complex to future all-IP based wireless networks. The MP HLR 101 is advantageous in environments where users subscribe to more than one wireless and/or wireline service and enables seamless roaming of a multi-mode phone between different networks, e.g., between GSM and TDMA. A unified HLR provides cost reduction benefits to the service provider, such as savings gained from synchronizing and updating one HLR instead of many HLRs.

Additionally, the MP HLR 101 knows one of either the Gateway MSC or originating MSC type as well as the visiting MSC type. This knowledge allows the MP HLR 101 to direct the call to a Gateway MSC of the same type as the visiting MSC. Additionally, because the MP HLR 101 knows the true MSC on which the subscriber is registered, the MP HLR 101 may perform normal protocol procedures, e.g., call barring, call forwarding interactions with outgoing call barring, normal HLR restoration procedures, and regional zone subscription. The MP HLR 101 is able to offer a wider variety of services to multi-mode subscribers than just those that may be interworked. The subscriber is able to obtain true services according to whatever protocol the subscriber is currently registered.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

TABLE 1

| MP HLR COMMON OPERATION | ANSI-41/ANSI-136 | GSM |
| --- | --- | --- |
| Register Terminal | Registration Notification | Update Location |
| Deregister Terminal | MS Inactive | Purge MS |
| Request Location | SMS Request | Send Routing Info for GPRS/SM |
| Request Location | Location Request | Send Routing Info. |
| Perform DB Operation | Feature Request | Register SS Erase SS Active SS Deactive SS Interrogate SS Register Password |
| Cancel Terminal Regis. | Registration Cancellation | Cancel Location |
| Retrieve Profile | Qualification Directive | Insert Subscriber Data |
| Insert Profile | Qualification Directive | Delete Subscriber Data |
| Request Route Info. | Route Request | Provide Roaming Number |
| Notify Events | OAM | OAM |
| Report Terminal Status | (Registration Notification) | Ready for SM Report SM Delivery Status Failure Report |
| Notify Terminal Status Change | SMS Notification | Note MS GPRS Present Alert Service Center |

TABLE 1-continued

| MP HLR COMMON OPERATION | ANSI-41/ANSI-136 | GSM |
|---|---|---|
| Obtain Authorization Info. | Authorization Request Authorization Directive | Send Authentication Information |
| Verify Authorization Info. | Authorization Request BS Challenge | |
| Challenge | | |

TABLE 2 comprises a list of acronyms utilized in the above description.

TABLE 2

| | |
|---|---|
| AAA | Authentication, Authorization, and Accounting |
| ACK | Acknowledgment |
| AG | Application Gateway |
| API | Application Programming Interface |
| ATI | Any Time Interrogation |
| BOIC | Barring of Outgoing International Calls |
| BSS | Base Station System |
| CAMEL | Customized Application for Mobile Network Enhanced Logic |
| CDMA | Code Division Multiple Access |
| CF | Call Forwarding |
| CFB | Call Forward Busy |
| CFNRG | Call Forwarding on Mobile Subscriber Not Reachable |
| CONT | Continue |
| EDGE | Enhanced Data Rates for GPRS Evolution |
| FTN | Forward to Number |
| GGSN | Gateway GPRS Service Node |
| GMSC | Gateway Mobile Switching Center |
| GPRS | General Packet (Data) Radio Service |
| GSM | Group Special Mobile/Global System for Mobile Communications |
| HDR | High Data Rate |
| HLR | Home Location Register |
| IAM | Initial Address Message |
| IN | Intelligent Networking |
| InitDP | Initial Detection Point |
| IP | Internet Protocol |
| LOC/ST | Location/State |
| MC | Message Center |
| MD | Mediation Device |
| M-IP | Mobile IP |
| MP HLR | Multiple-Protocol Home Location Register |
| MS | Mobile Station |
| MSC | Mobile Switching Center |
| MSRN | Mobile Subscribing Roaming Number |
| OAM | |
| PG | Protocol Gateway |
| PN | Party Number |
| PRN | Provide Roaming Number |
| PSI | Provide Subscriber Information |
| PSTN | Public Switch Telephone Network |
| RCH | Resume Call Handling |
| SC | Service Center |
| SCP | Service Control Point |
| SGSN | Serving GPRS Service Node |
| SIP | Session Initiation Protocol |
| SMSC | Short Message Service Center |
| SPA | Service Package Application |
| SRI | Send Routing Information |
| SS7 | Standard Signaling System 7 |
| TDMA | Time Division Multiple Access |
| TLDN | Temporary Location Directory Number |
| UMTS | Universal Mobile Telecommunications System |
| VLR | Visitor Location Register |
| VMS | Voice Message System |
| VMSC | Visited Mobile Switching Center |

What is claimed is:

1. A multiple-protocol home location register comprising:

a receiver for receiving, from a first standard HLR of a requesting network of at least two networks and without a requirement for any modification to the first standard HLR, a network request according to one of at least two network protocols;

a processor, within the multiple-protocol home location register, wherein the processor is arranged and constructed to generate network messages according to the at least two network protocols and to process the network request to obtain information requested by the network request;

a transmitter, operably coupled to the processor, for relaying the requested information to at least one of the requesting network and a destination network;

a mediation device;

wherein the requesting network comprises the first standard HLR and a first mobile switching center that communicate through employment of a first network protocol of the at least two network protocols;

wherein the destination network comprises a second standard HLR and a second mobile switching center that communicate through employment of a second network protocol of the at least two network protocols;

wherein the multiple-protocol home location register performs a call delivery of a call that originates at a communication device in the requesting network and terminates in the destination network;

wherein the first mobile switching center receives an initial address message from the communication device through employment of the first network protocol, wherein the initial address message comprises a called party number;

wherein the first mobile switching center sends routing information to the first standard HLR in response to the initial address message through employment of the first network protocol;

wherein the first standard HLR determines that the destination network employs the second network protocol;

wherein the first standard HLR sends a provide roaming number message with a first mobile switching center address and first network protocol type to the mediation device;

wherein the mediation device stores the first mobile switching center address and the first network protocol type;

wherein the mediation device converts the provide roaming number message to a location request message in the second network protocol, wherein the location request message comprises a mobile switching center identification that identifies the mediation device;

wherein the mediation devices sends the location request message to the second standard HLR;

wherein the second standard HLR sends a route request message to the second mobile switching center through employment of the second network protocol, wherein the route request message comprises the mobile switching center identification that identifies the mediation device;

wherein the second mobile switching center sends an acknowledgement message to the second standard HLR in response to the route request message through employment of the second network protocol, wherein the acknowledgement message comprises a temporary location directory number;

wherein the second standard HLR relays the acknowledgement message to the mediation device through employment of the second network protocol;

wherein the mediation device sends a provide roaming number acknowledgement with a mobile subscribing roaming number to the first standard HLR through employment of the first network protocol;

wherein the first standard HLR sends a send routing information acknowledgement to the first mobile switching center through employment of the first network protocol, wherein the send routing information acknowledgement comprises the mobile subscribing roaming number;

wherein the first mobile switching center sends the initial address message with the mobile subscribing roaming number to the second mobile switching center; wherein the second mobile switching canter completes the call to the destination network.

2. The multiple-protocol home location register of claim 1, wherein the processor is further arranged and constructed to translate messages according to the at least two network protocols.

3. The multiple-protocol home location register of claim 1, wherein the requested information is generated in response to a communication device request to communicate with a serving network.

4. The multiple-protocol home location register of claim 1, wherein the processor is further arranged and constructed to send a profile for a communication device to a serving network and to format the profile according to the serving networks protocol.

5. A method comprising the steps of:

receiving, by a multiple-protocol home location register, a network request from a first standard HLR of a requesting network of at least two networks and without a requirement for any modification to the first standard HLR, wherein the network request is composed according to one of at least two network protocols;

processing the network request to obtain information requested by the network request;

generating at least one network message according to at least one of the at least two network protocols and sending the at least one network message to at least one network supporting the at least one of the at least two network protocols;

relaying the requested information to a destination network;

receiving, at a first mobile switching center of the requesting network, an initial address message from a communication device through employment of a first network protocol of the at least two network protocols, wherein the initial address message comprises a called party number;

sending routing information from the first mobile switching center to the first standard HLR in response to the initial address message through employment of the first network protocol;

determining, by the first standard HLR, that the destination network employs a second network protocol of the at least two network protocols;

sending, by the first standard HLR, a provide roaming number message with a first mobile switching center address and first network protocol type to a mediation device;

storing, by the mediation device, the first mobile switching center address and the first network protocol type;

converting, by the mediation device, the provide roaming number message to a location request message in the second network protocol, wherein the location request message comprises a mobile switching center identification that identifies the mediation device;

sending, by the mediation device, the location request message to a second standard HLR of the destination network;

sending, by the second standard HLR, a route request message to the second mobile switching center through employment of the second network protocol, wherein the route request message comprises the mobile switching center identification that identifies the mediation device;

sending, by the second mobile switching center, an acknowledgement message to the second standard HLR in response to the route request message through employment of the second network protocol, wherein the acknowledgement message comprises a temporary location directory number;

relaying, by the second standard HLR, the acknowledgement message to the mediation device through employment of the second network protocol;

sending, by the mediation device, a provide roaming number acknowledgement with a mobile subscribing roaming number to the first standard HLR through employment of the first network protocol;

sending, by the first standard HLR, a send routing information acknowledgement to the first mobile switching center through employment of the first network protocol, wherein the send routing information acknowledgement comprises the mobile subscribing roaming number;

sending, by the first mobile switching center, the initial address message with the mobile subscribing roaming number to the second mobile switching center; and completing, by the second mobile switching center, the call to the destination network.

6. The method of claim 5, wherein the step of processing comprises the step of translating the network request.

7. The method of claim 5, wherein the step of processing comprises the step of converting a Location Request message to a Provide Roaming Number message.

8. The method of claim 5, wherein the step of processing comprises the step of converting a Send Routing Information message to a Routing Request message.

9. The method of claim 5, wherein the step of processing comprises the step of distributing, throughout the multiple-protocol home location register, subscriber information for a plurality of communications devices.

10. The method of claim 5, wherein the step of processing comprises the step of determining and storing a protocol type and an address for an infrastructure device.

11. The method of claim 10, wherein the infrastructure device is a gateway mobile switching center.

12. The method of claim 5, wherein the step of processing comprises the step of determining and storing a protocol type and an address for a communication device.

13. The method of claim 12, wherein the step of processing comprises the step of determining and storing a protocol type and an address for a serving network for the communication device.

14. The method of claim 5, wherein the multiple-protocol home location register receives a network request, regarding a communication device, from an infrastructure device, regardless of the communication device's native mode protocol.

15. The method of claim 5, further comprising the step of detecting a protocol type for an infrastructure device, and when the protocol type for the infrastructure device is not a first network protocol, communicating through a mediation device to a borne location register of the protocol type for the infrastructure device.

16. The method of claim 5, wherein the at least two networks comprise at least one of a terminating mobile switching center, a visited mobile switching center, a gateway mobile switching center, a packet gateway, and an internet protocol gateway.

17. The method of claim 5, further comprising the step of storing call forwarding information such that processing for call forwarded communications takes place between a mediation device in the multiple-protocol home location register and a terminating mobile switching center.

18. The method of claim 5, further comprising the step of issuing an instruction to a previous mobile switching center to delete a visited location register for a communication device.

19. The method of claim 5, wherein the step of processing comprises the step of storing an identification of an infrastructure device that terminates a call.

20. The method of claim 5, wherein the step of processing comprises the step of determining whether a communication device supports multiple-mode operation.

21. The method of claim 5, wherein the step of processing comprises the step of converting a short messaging service message from a first network protocol to a second network protocol.

22. The method of claim 5, wherein the step of processing comprises the steps of routing a pre-paid call, originating according to a first protocol of the at least two network protocols, to an infrastructure device operating according to a second protocol of the at least two network protocols and handling the pre-paid call according to normal call processing procedures for the second protocol.

23. The method of claim 5, wherein the at least two networks comprise at least one of a terminating mobile switching center, a visited mobile switching center, a gateway mobile switching center, a packet gateway, and an internet protocol gateway.

24. The method of claim 5, wherein the destination network is determined by a location for a communication device associated with the network request.

25. The multiple-protocol home location register of claim 1, wherein the standard HLR comprises a standalone HLR.

26. The method of claim 5, wherein the first standard HLR comprises a standalone HLR.

27. A multiple-protocol home location register comprising:
 a first standard HLR arranged and constructed to provide a first network protocol;
 a second standard HLR arranged and constructed to provide a second network protocol;
 a mediation device, operably coupled to the first standard HLR and the second standard HLR without a requirement for any modification to the first standard HLR and/or the second standard HLR, wherein the mediation device is arranged and constructed to generate network messages according to the first network protocol and the second network protocol; such that the multiple-protocol HLR provides HLR capability for a plurality of communication devices utilizing any of the first network protocol and the second network protocol;
 a requesting network and a destination network;
 wherein the requesting network comprises the first standard HLR and a first mobile switching center that communicate through employment of a first network protocol of the at least two network protocols;
 wherein the destination network comprises the second standard HLR and a second mobile switching center that communicate through employment of a second network protocol of the at least two network protocols;
 wherein the multiple-protocol home location register performs a call delivery of a call that originates at a communication device in the requesting network and terminates in the destination network;
 wherein the first mobile switching center receives an initial address message from the communication device through employment of the first network protocol, wherein the initial address message comprises a called party number;
 wherein the first mobile switching center sends routing information to the first standard HLR in response to the initial address message through employment of the first network protocol;
 wherein the first standard HLR determines that the destination network employs the second network protocol;
 wherein the first standard HLR sends a provide roaming number message with a first mobile switching center address and first network protocol type to the mediation device;
 wherein the mediation device stores the first mobile switching center address and the first network protocol type;
 wherein the mediation device converts the provide roaming number message to a location request message in the second network protocol, wherein the location request message comprises a mobile switching center identification that identifies the mediation device;
 wherein the mediation devices sends the location request message to the second standard HLR;
 wherein the second standard HLR sends a route request message to the second mobile switching center through employment of the second network protocol, wherein the route request message comprises the mobile switching center identification that identifies the mediation device;
 wherein the second mobile switching center sends an acknowledgement message to the second standard HLR in response to the route request message through employment of the second network protocol, wherein the acknowledgement message comprises a temporary location directory number;
 wherein the second standard HLR relays the acknowledgement message to the mediation device through employment of the second network protocol;
 wherein the mediation device sends a provide roaming number acknowledgement with a mobile subscribing roaming number to the first standard HLR through employment of the first network protocol;
 wherein the first standard HLR sends a send routing information acknowledgement to the first mobile switching center through employment of the first network protocol, wherein the send routing information acknowledgement comprises the mobile subscribing roaming number;
 wherein the first mobile switching center sends the initial address message with the mobile subscribing roaming number to the second mobile switching center; wherein the second mobile switching center completes the call to the destination network.

28. The multiple-protocol HLR of claim 27, wherein the mediation device is further arranged and constricted to translate messages between the first network protocol and the second network protocol.

29. The multiple-protocol HLR of claim 27, wherein the mediation device is arranged and constructed to convert a Provide Roaming Number message to a Location Request message.

30. The multiple-protocol HLR of claim 27, wherein the mediation device is arranged and constructed to convert a Routing Request message to a Send Routing Information message.

31. The multiple-protocol HLR of claim 27, further comprising a provisioning gateway, operably coupled to the first standard HLR and the second standard HLR, wherein the provisioning gateway is arranged and constructed to distribute, among the first standard HLR and the second standard HLR, subscriber information for the plurality of communication devices.

32. The multiple-protocol HLR of claim 27, wherein the first and second network protocols comprise at least one of ANSI-41, GSM MAP, SIP, H.323, AAA, and M-IP.

33. The multiple-protocol HLR of claim 27, wherein the mediation device is further arranged and constructed to determine and store a protocol type and an address for an infrastructure device.

34. The multiple-protocol HLR of claim 33, wherein the infrastructure device is a gateway mobile switching center.

35. The multiple-protocol HLR of claim 33, wherein the mediation device is further arranged and constructed to determine and store a protocol type and an address for a communication device.

36. The multiple-protocol HLR of claim 35, wherein the mediation device is further arranged and constructed to determine and store a protocol type and an address for a serving network for the communication device.

37. The multiple-protocol HLR of claim 27, wherein the first standard HLR is further arranged and constructed to receive a query, regarding a communication device, from an infrastructure device supporting the first network protocol, regardless of whether the communication device's native mode is of the first network protocol.

38. The multiple-protocol HLR of claim 27, wherein the first standard HLR is further arranged and constructed to detect a protocol type for an infrastructure device, and when the protocol type for the infrastructure device is not the first network protocol, to communicate through the mediation device to the second standard HLR or a standard HLR of the protocol type for the infrastructure device.

39. The multiple-protocol HLR of claim 27, wherein the mediation device is further arranged and constructed to store call forwarding information such that processing for call forwarded communications takes place between the mediation device and a terminating mobile switching center.

40. The multiple-protocol HLR of claim 27, wherein the plurality of communication devices comprise at least one of a terminating mobile switching center, a visited mobile switching center, a gateway mobile switching center, a packet gateway, and an internet protocol gateway.

41. The multiple-protocol home location register of claim 27, wherein the first standard HLR comprises a standalone HLR.

42. A system comprising:
a first standard HLR arranged and constructed to generate at least one query according to a first network protocol without a requirement for any modification to the first standard HLR;
a second standard HLR arranged and constructed to function according to a second network protocol without a requirement for any modification to the second standard HLR; and
a multiple-protocol home location register, operably coupled to the first standard HLR and the second standard HLR, wherein the multiple-protocol home location register is arranged and constructed to function according to the first network protocol and the second protocol, such that a call request according to the first network protocol and related to the at least one query is completed according to the second network protocol;
a requesting network and a destination network;
wherein the requesting network comprises the first standard HLR and a first mobile switching center that communicate through employment of a first network protocol of the at least two network protocols;
wherein the destination network comprises the second standard HLR and a second mobile switching center that communicate through employment of a second network protocol of the at least two network protocols;
wherein the multiple-protocol home location register performs a call delivery of a call that originates at a communication device in the requesting network and terminates in the destination network;
wherein the first mobile switching center receives an initial address message from the communication device through employment of the first network protocol, wherein the initial address message comprises a called party number;
wherein the first mobile switching center sends routing information to the first standard HLR in response to the initial address message through employment of the first network protocol;
wherein the first standard HLR determines that the destination network employs the second network protocol;
wherein the first standard HLR sends a provide roaming number message with a first mobile switching center address and first network protocol type to the multiple-protocol home location register;
wherein the multiple protocol home location register stores the first mobile switching center address and the first network protocol type;
wherein the multiple-protocol home location register converts the provide roaming number message to a location request message in the second network protocol, wherein the location request message comprises a mobile switching center identification that identifies the multiple-protocol home location register;
wherein the multiple-protocol home location register sends the location request message to the second standard HLR;
wherein the second standard HLR sends a route request message to the second mobile switching center through employment of the second network protocol, wherein the route request message comprises the mobile switching center identification that identifies the multiple protocol home location register;
wherein the second mobile switching center sends an acknowledgement message to the second standard HLR in response to the route request message through employment of the second network protocol, wherein the acknowledgement message comprises a temporary location directory number;
wherein the second standard HLR relays the acknowledgement message to the multiple-protocol home location register through employment of the second network protocol;

wherein the multiple-protocol home location register sends a provide roaming number acknowledgement with a mobile subscribing marring number to the first standard HLR through employment of the first network protocol;

wherein the first standard HLR sends a send routing information acknowledgement to the first mobile switching center through employment of the first network protocol, wherein the send routing information acknowledgement comprises the mobile subscribing roaming number, wherein the first mobile switching center sends the initial address message with the mobile subscribing roaming number to the second mobile switching center; wherein the second mobile switching center completes the call to the destination network.

43. The system of claim 42, wherein the at least one query is generated in response to a communication device request to communicate with a serving network.

44. The system of claim 43, wherein a profile for the communication device is sent to the serving network and the profile is formatted according to the serving network's protocol.

45. The system of claim 43, wherein the serving network utilizes the first network protocol.

46. The system of claim 42, wherein the multiple-protocol home location register is further arranged and constructed to provide call forwarding functionality.

47. The system of claim 42, wherein the call request is a call termination request.

48. The system of claim 42, further comprising a provisioning gateway, operably coupled to the multiple-protocol home location register, wherein the provisioning gateway is arranged and constructed to provide subscriber information for the plurality of communication devices.

49. The system of claim 42, wherein the first and second network protocols comprise at least one of ANSI-41, GSM MAP, SIP, H.323, AAA, and M-IP.

50. The system of claim 42, wherein the multiple-protocol home location register is further arranged and constructed to determine and store a protocol type and an address for the first standard HLR.

51. The system of claim 42, wherein the first standard HLR is further arranged and constructed to receive a request from a communication device regardless of whether the communication device's native mode is of the first network protocol.

52. The system of claim 42, wherein the multiple-protocol home location register is further arranged and constructed to store call forwarding information such that processing for call forwarded communications takes place between the multiple-protocol home location register and the second standard HLR.

53. The system of claim 42, wherein any infrastructure device is one of a terminating mobile switching center, a visited mobile switching center, a gateway mobile switching center, a packet gateway and an internet protocol gateway.

54. The system of claim 42, wherein the first standard HLR generates the at least one query for a gateway mobile switching center.

55. The system of claim 42, wherein the second standard HLR handles the at least one query for a terminating mobile switching center.

56. The system of claim 42, wherein the first standard HLR comprises a standalone HLR.

57. A method comprising the steps of generating, by a first standard HLR of a requesting network for a first infrastructure device and without a requirement: for arty modification to the first standard HLR, a query according to a first network protocol;

sending the first network protocol query to a multiple-protocol home location register functioning according to the first network protocol and a second network protocol;

processing, by the multiple-protocol home location register, the first network protocol query, thereby generating a second network protocol message;

sending the second network protocol message to a second standard HLR of a destination network for a second infrastructure device functioning according to the second network protocol and without a requirement for any modification to the second standard HLR;

receiving, at a first mobile switching center of the requesting network, an initial address message from a communication device through employment of a first network protocol of the at least two network protocols, wherein the initial address message comprises a called party number;

sending routing information from the first mobile switching center to the first standard HLR in response to the initial address message through employment of the first network protocol;

determining, by the first standard HLR, that the destination network employs a second network protocol of the at least two network protocols;

sending, by the first standard HLR, a provide roaming number message with a first mobile switching center address and first network protocol type to a mediation device;

storing, by the mediation device, the first mobile switching center address and the link network protocol type;

converting, by the mediation device, the provide roaming number message to a location request message in the second network protocol, wherein the location request message comprises a mobile switching center identification that identifies the mediation device;

sending, by the mediation device, the location request message to a second standard HLR of the destination network;

sending, by the second standard HLR, a route request message to the second mobile switching center through employment of the second network protocol, wherein the route request message comprises the mobile switching center identification that identifies the mediation device;

sending, by the second mobile switching center, an acknowledgement message to the second standard HLR in response to the route request message through employment of the second network protocol, wherein the acknowledgement message comprises a temporary location directory number;

relaying, by the second standard HLR, the acknowledgement message to the mediation device through employment of the second network protocol;

sending, by the mediation device, a provide roaming number acknowledgement with a mobile subscribing roaming number to the first standard HLR through employment of the first network protocol;

sending, by the first standard HLR, a send routing information acknowledgement to the first mobile switching center through employment of the first network protocol, wherein the send routing information acknowledgement comprises the mobile subscribing roaming number; sending, by the first mobile switching center, the initial address message with the mobile subscribing roaming number to the second mobile switching center;

completing, by the second mobile switching center, the call to the destination network.

58. The method of claim 57, wherein the step of processing comprises the step of translating the network request.

59. The method of claim 57, wherein the step of processing comprises the step of converting a Location Request message to a Provide Roaming Number message.

60. The method of claim 57, wherein the step of processing comprises the step of converting a Routing Request message to a Send Routing Information message.

61. The method of claim 57, wherein the step of processing comprises the step of distributing, throughout the multiple-protocol home location register, subscriber information for a plurality of communication devices.

62. The method of claim 57, wherein the step of processing comprises the step of determining and storing a protocol type and an address for the first infrastructure device.

63. The method of claim 57, wherein the multiple-protocol home location register receives a network request, regarding a communication device, from the first standard HLR, regardless of the communication device's native mode protocol.

64. The method of claim 57, further the step of detecting a protocol type for the second infrastructure device, and when the protocol type for the second infrastructure device is not the first network protocol, processing the first network protocol query according to the protocol type for the second infrastructure device.

65. The method of claim 57, further comprising the step of storing call forwarding information such that processing for call forwarded communications takes place between the multiple-protocol home location register, the second standard HLR, and the second infrastructure device.

66. The method of claim 57, further comprising the step of issuing an instruction to a previous mobile switching center to delete a visited location register for a communication device.

67. The method of claim 57, wherein the step of processing comprises the step of storing an identification of the second infrastructure device for a call.

68. The method of claim 57, wherein the step of processing comprises the step of determining whether a communication device supports multiple-mode operation.

69. The method of claim 57, wherein the step of processing comprises the step of converting a short messaging service message from a first network protocol to a second network protocol.

70. The method of claim 57, wherein the step of processing comprises the steps of routing a pre-paid call, originating according to the first protocol, to a third infrastructure device and handling the pre-paid call according to normal call processing procedures for the second protocol.

71. The method of claim 70, wherein the step of routing is based on at least one of a prefix plus a called party number and a different number.

72. The method of claim 57, wherein any of the first and/or second infrastructure devices is one of a terminating mobile switching center, a visited mobile switching center, a gateway mobile switching center, a packet gateway, and an internet protocol gateway.

73. The method of claim 57, wherein the first infrastructure device is a gateway mobile switching center.

74. The method of claim 57, wherein the second infrastructure device is a terminating mobile switching center.

75. The method of claim 57, wherein the step of processing comprises the steps of routing a call, originating according to the first protocol, to a third infrastructure device of the second protocol and handling the call according to normal call processing procedures for the second protocol.

76. The method of claim 57, wherein the first standard HLR comprises a standalone HLR.

77. A multiple-protocol home location register comprising:

a receiver for receiving, from a standard HLR of a requesting network of at least two networks and without a requirement for any modification to the standard HLR, a network request according to one of at least two network protocols;

a processor, within the multiple-protocol home location register, wherein the processor is arranged and constructed to generate network messages according to the at least two network protocols and to process the network request to obtain information requested by the network request;

a transmitter, operably coupled to the processor, for relaying the requested information to at least one of the requesting network and a destination network;

a mediation device;

wherein the standard HLR comprises a first standard HLR;

wherein the requesting network comprises th first standard HLR and a first mobile switching center that communicate through employment of a first network protocol of the at least two network protocols;

wherein the destination network comprises a second standard HLR and a second mobile switching center that communicate through employment of a second network protocol of the at least two network protocols;

wherein the multiple-protocol home location register performs a call delivery of a call that originates at a communication device in the requesting network and terminates in the destination network;

wherein the first mobile switching center receives an initial address message from the communication device through employment of the first network protocol, wherein the initial address message comprises a called party number;

wherein the first mobile switching center sends routing information to the first standard HLR in response to the initial address message through employment of the first network protocol;

wherein the first standard HLR determines that the destination network employs the second network protocol;

wherein the first standard HLR sends a provide roaming number message with a first mobile switching center address and first network protocol type to the mediation device;

wherein the mediation device stores the first mobile switching center address and the first network protocol type;

wherein the mediation device converts the provide roaming number message to a location request message in the second network protocol, wherein the location request message comprises a mobile switching center identification that identifies the mediation device;

wherein the mediation devices sends the location request message to the second standard HLR;

wherein the second standard HLR sends a route request message to the second mobile switching center through employment of the second network protocol, wherein the route request message comprises the mobile switching center identification that identifies the mediation device;

wherein the second mobile switching center sends an acknowledgement message to the second standard HLR in response to the route request message through employment of the second network protocol, wherein the acknowledgement message comprises a temporary location directory number;

wherein the second standard HLR relays the acknowledgement message to the mediation device through employment of the second network protocol;

wherein the mediation device sends a provide roaming number acknowledgement with a mobile subscribing roaming number to the first standard HLR through employment of the first network protocol;

wherein the first standard HLR sends a send routing information acknowledgement to the first mobile switching center through employment of the first network protocol, wherein the send routing information acknowledgement comprises the mobile subscribing roaming number;

wherein the first mobile switching center sends the initial address message with the mobile subscribing roaming number to the second mobile switching center, wherein the second mobile switching center completes the call to the destination network.

78. A method comprising the steps of:

receiving, by a multiple-protocol home location resister, a network request from a first standard HLR of a requesting network of at least two networks and without a requirement for any modification to the standard HLR, wherein the network request is composed according to one of at least two network protocols;

processing the network request to obtain information requested by the network request;

generating at least one network message according to at least one of the at least two network protocols and sending the at least one network message to at least one network supporting the at least one of the at least two network protocols;

relaying the requested information to a destination network;

receiving, at a first mobile switching center of the requesting network, an initial address message from a communication device through employment of a first network protocol of the at least two network protocols, wherein the initial address message comprises a called party number;

sending routing information from the first mobile switching center to the first standard HLR in response to the initial address message through employment of the first network protocol;

determining, by the first standard HLR, that the destination network employs a second network protocol of the at least two network protocols;

sending, by the first standard HLR, a provide roaming number message with a first mobile switching center address and first network protocol type to a mediation device;

storing, by the mediation device, the first mobile switching center address arid the first network protocol type;

converting, by the mediation device, the provide roaming number message to a location request message in the second network protocol, wherein the location request message comprises a mobile switching center identification that identifies the mediation device;

sending, by the mediation device, the location request message to a second standard HLR of the destination network;

sending, by the second standard HLR, a route request message to the second mobile switching center through employment of the second network protocol, wherein the route request message comprises the mobile switching center identification that identifies the mediation device;

sending, by the second mobile switching center, an acknowledgement message to the second standard HLR in response to the route request message through employment of the second network protocol, wherein the acknowledgement message comprises a temporary location directory number;

relaying, by the second standard HLR, the acknowledgement message to the mediation device through employment of the second network protocol;

sending, by the mediation device, a provide roaming number acknowledgement with a mobile subscribing roaming number to the first standard HLR through employment of the first network protocol;

sending, by the first standard HLR, a send routing information acknowledgement to the first mobile switching center through employment of the fist network protocol, wherein the send routing information acknowledgement comprises the mobile subscribing roaming number;

sending, by the first mobile switching center, the initial address message with the mobile subscribing roaming number to the second mobile switching center; and completing, by the second mobile switching center, the call to the destination network.

79. A multiple-protocol home location register comprising:

a first standard HLR arranged and constructed to provide a first network protocol;

a second standard HLR arranged and constructed to provide a second network protocol;

a mediation device, operably coupled to the first standard HLR and the second standard HLR without a requirement for any modification to the first standard HLR and/or the second standard HLR, wherein the mediation device is arranged and constructed to generate network messages according to the first network protocol and the second network protocol such that the multiple-protocol HLR provides HLR capability for a plurality of communication devices utilizing any of the first network protocol and the second network protocol; and a requesting network and a destination network;

wherein the requesting network comprises the first standard HLR and a first mobile switching center that communicate through employment of a first network protocol of the at least two network protocols;

wherein the destination network comprises the second standard HLR and a second mobile switching center that communicate through employment of a second network protocol of the at least two network protocols;

wherein the multiple-protocol home location register performs a call delivery of a call that originates at a communication device in the requesting network and terminates in the destination network;

wherein the first mobile switching center receives an initial address message from the communication device through employment of the first network protocol, wherein the initial address message comprises a called party number;

wherein the first mobile switching center sends routing information to the first standard HLR in response to the initial address message through employment of the first network protocol;

wherein the first standard HLR determines that the destination network employs the second network protocol;

wherein the first standard HLR sends a provide roaming number message with a first mobile switching center address and first network protocol type to the mediation device;

wherein the mediation device stores the first mobile switching center address and the first network protocol type;

wherein the mediation device converts the provide roaming number message to a location request message in the second network protocol, wherein the location request message comprises a mobile switching center identification that identifies the mediation device;

wherein the mediation devices sends the location request message to the second standard HLR;

wherein the second standard HLR sends a route request message to the second mobile switching center through employment of the second network protocol, wherein the route request message comprises the mobile switching center identification that identifies the mediation device;

wherein the second mobile switching center sends an acknowledgement message to the second standard HLR in response to the route request message through employment of the second network protocol, wherein the acknowledgement message comprises a temporary location directory number;

wherein the second standard HLR relays the acknowledgement message to the mediation device through employment of the second network protocol;

wherein the mediation device sends a provide roaming number acknowledgement with a mobile subscribing roaming number to the first standard HLR through employment of the first network protocol;

wherein the first standard HLR sends a send routing information acknowledgement to the first mobile switching center through employment of the first network protocol, wherein the send routing information acknowledgement comprises the mobile subscribing roaming number;

wherein the first mobile switching center sends the initial address message with the mobile subscribing roaming number to the second mobile switching center;

wherein the second mobile switching center completes the call to the destination network.

80. A system comprising:

a first standard HLR arranged and constructed to generate at least one query according to a first network protocol without a requirement for any modification to the first standard HLR;

a second standard HLR arranged and constructed to function according to a second network protocol without a requirement for any modification to the second standard HLR;

a multiple-protocol home location register, operably coupled to the first standard HLR and the second standard HLR, wherein the multiple-protocol home location register is arranged and constructed to function according to the first network protocol and the second protocol, such that a call request according to the first network protocol and related to the at least one query is completed according to the second network protocol;

a requesting network and a destination network;

wherein the requesting network comprises the first standard HLR and a first mobile switching center that communicate through employment of a first network protocol of the at least two network protocols;

wherein the destination network comprises the second standard HLR and a second mobile switching center that communicate through employment of a second network protocol of the at least two network protocols;

wherein the multiple-protocol home location register performs a call delivery of a call that originates at a communication device in the requesting network and terminates in the destination network;

wherein the first mobile switching center receives an initial address message from the communication device through employment of the first network protocol, wherein the initial address message comprises a called party number;

wherein the first mobile switching center sends routing information to the first standard HLR in response to the initial address message through employment of the first network protocol;

wherein the first standard HLR determines that the destination network employs the second network protocol;

wherein the first standard HLR sends a provide roaming number message with a first mobile switching center address and first network protocol to the multiple-protocol home location register;

wherein the multiple-protocol home location register stores the first mobile switching center address and the first network protocol type;

wherein the multiple-protocol home location register converts the provide roaming number message to a location request message in the second network protocol, wherein the location request message comprises a mobile switching center identification that identifies the multiple-protocol home location register;

wherein the multiple-protocol home location register sends the location request message to the second standard HLR;

wherein the second standard HLR sends a route request message to the second mobile switching center through employment of the second network protocol, wherein the route request message comprises the mobile switching center identification that identifies the multiple-protocol home location register;

wherein the second mobile switching center sends an acknowledgement message to the second standard HLR in response to the route request message through employment of the second network protocol, wherein the acknowledgement message comprises a temporary location directory number;

wherein the second standard HLR relays the acknowledgement message to the multiple-protocol home location register through employment of the second network protocol;

wherein the multiple-protocol home location register sends a provide roaming number acknowledgement with a mobile subscribing roaming number to the first standard HLR through employment of the first network protocol;

wherein the first standard HLR sends a send routing information acknowledgement to the first mobile switching center through employment of the first network protocol, wherein the send routing information acknowledgement comprises the mobile subscribing roaming number;

wherein the first mobile switching center sends the initial address message with the mobile subscribing roaming number to the second mobile switching center;

wherein the second mobile switching center completes the call to the destination network.

81. A method comprising the steps of:

generating, by a first standard HLR of a requesting network for a first infrastructure device and without a requirement for any modification to the first standard HLR, a query according to a first network protocol;

sending the first network protocol query to a multiple-protocol home location register functioning according to the first network protocol and a second network protocol;

processing, by the multiple-protocol home location register, the first network protocol query, thereby generating a second network protocol message;

sending the second network protocol message to a second standard HLR of a destination network for a second infrastructure device function according to the second network protocol and without a requirement for any modification to the second standard HLR;

receiving, at a first mobile switching center of the requesting network, an initial address message from a communication device through employment of a first network protocol of the at least two network protocols, wherein the initial address message comprises a called party number;

sending routing information from the first mobile switching center to the first standard HLR in response to the initial address message through employment of the first network protocol;

determining, by the first standard HLR, that the destination network employs a second network protocol of the at least two network protocols;

sending, by the first standard HLR, a provide roaming number message with a first mobile switching center address and first network protocol type to a mediation device;

storing, by the mediation device, the first mobile switching center address and the first network protocol type;

converting, by the mediation device, the provide roaming number message to a location request message in the second network protocol, wherein the location request message comprises a mobile switching center identification that identifies the mediation device;

sending, by the mediation device, the location request message to a second standard HLR of the destination network;

sending, by the second standard HLR, a route request message to the second mobile switching center through employment of the second network protocol, wherein the route request message comprises the mobile switching center identification that identifies the mediation device;

sending, by the second mobile switching center, an acknowledgement message to the second standard HLR in response to the route request message through employment of the second network protocol, wherein the acknowledgement message comprises a temporary location directory number;

relaying, by the second standard HLR, the acknowledgement message to the mediation device through employment of the second network protocol;

sending, by the mediation device, a provide roaming number acknowledgement with a mobile subscribing roaming number to the first standard HLR through employment of the first network protocol;

sending, by the first standard HLR, a send routing information acknowledgement to the first mobile switching center through employment of the first network protocol, wherein the send routing information acknowledgement comprises the mobile subscribing roaming number;

sending, by the first mobile switching center, the initial address message with the mobile subscribing roaming number to the second mobile switching center;

completing, by the second mobile switching center, the call to the destination network.

* * * * *